US012812367B2

(12) United States Patent
Ho et al.

(10) Patent No.: US 12,812,367 B2
(45) Date of Patent: Nov. 24, 2026

(54) MULTI-LINK DEVICE (MLD) BASED RELAY ARCHITECTURE

(71) Applicant: QUALCOMM Incorporated, San Diego, CA (US)

(72) Inventors: Sai Yiu Duncan Ho, San Diego, CA (US); Abhishek Pramod Patil, San Diego, CA (US); George Cherian, San Diego, CA (US); Alfred Asterjadhi, San Diego, CA (US); Yanjun Sun, San Diego, CA (US); Abdel Karim Ajami, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 18/582,492

(22) Filed: Feb. 20, 2024

(65) Prior Publication Data

US 2024/0340638 A1 Oct. 10, 2024

Related U.S. Application Data

(60) Provisional application No. 63/495,065, filed on Apr. 7, 2023.

(51) Int. Cl.
*H04W 12/03* (2021.01)
*H04L 5/00* (2006.01)
(Continued)

(52) U.S. Cl.
CPC ........... *H04W 12/03* (2021.01); *H04L 5/0053* (2013.01); *H04W 12/0431* (2021.01); *H04W 12/106* (2021.01)

(58) Field of Classification Search
CPC ............. H04W 12/03; H04W 12/0431; H04W 12/106; H04L 5/0053
See application file for complete search history.

(56) References Cited

U.S. PATENT DOCUMENTS 11,658,865 B2 * 5/2023 Zimny .................. H04W 12/06 709/220
2011/0090880 A1 * 4/2011 Abraham .............. H04W 12/08 370/328
(Continued)

FOREIGN PATENT DOCUMENTS

WO 2022155795 A1 7/2022
WO 2022193945 A1 9/2022
WO 2023211363 A1 11/2023

OTHER PUBLICATIONS

International Search Report and Written Opinion—PCT/US2024/016742—ISA/EPO—Jun. 10, 2024.

*Primary Examiner* — Mohamed Barakat
(74) *Attorney, Agent, or Firm* — Patterson & Sheridan LLP

(57) ABSTRACT

This disclosure provides methods, components, devices and systems for performing actions to reduce end-to-end latency during a transmission of an encrypted payload of a medium access control (MAC) protocol data unit (MPDU) from a root access point (AP) to a wireless station (STA) via a satellite AP. For example, the satellite AP may be configured to receive the encrypted payload from the root AP, and then forward the received encrypted payload to the wireless STA, without decrypting the received encrypted payload and re-encrypting unencrypted payload at the satellite AP.

27 Claims, 16 Drawing Sheets

(51) Int. Cl.
*H04W 12/0431* (2021.01)
*H04W 12/106* (2021.01)

(56) References Cited

U.S. PATENT DOCUMENTS

| | | | | |
|---|---|---|---|---|
| 2015/0271672 | A1* | 9/2015 | Ding | H04W 12/033<br>713/153 |
| 2018/0063037 | A1* | 3/2018 | Edwards | H04W 56/002 |
| 2019/0097952 | A1* | 3/2019 | Yong | H04L 49/9057 |
| 2021/0006361 | A1* | 1/2021 | Asterjadhi | H04W 74/0816 |
| 2021/0100051 | A1* | 4/2021 | Ho | H04W 12/033 |
| 2023/0049552 | A1 | 2/2023 | Chitrakar et al. | |
| 2023/0085657 | A1 | 3/2023 | Kneckt et al. | |
| 2024/0088988 | A1* | 3/2024 | Yang | H04B 7/15507 |

* cited by examiner

MULTI-LINK DEVICE (MLD) BASED RELAY ARCHITECTURE

CROSS-REFERENCE TO RELATED APPLICATION

This application claims benefit of and priority to U.S. Provisional Patent Application No. 63/495,065, filed Apr. 7, 2023, which is hereby incorporated by reference in its entirety.

TECHNICAL FIELD

This disclosure relates generally to wireless communication, and more specifically, to a multi-link device (MLD) based relay architecture.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented at an apparatus for wireless communication. The apparatus includes a memory including instructions; and one or more processors, individually or collectively, configured to execute the instructions and cause the apparatus to: obtain an encrypted payload of a medium access control (MAC) protocol data unit (MPDU) transmitted from a first wireless node and intended for a second wireless node, wherein a wireless association between the apparatus and the second wireless node is with respect to the first wireless node; and forward the obtained encrypted payload to the second wireless node.

Another innovative aspect of the subject matter described in this disclosure can be implemented as a method for wireless communication performable at a first wireless node. The method may include obtaining an encrypted payload of a MPDU transmitted from a second wireless node and intended for a third wireless node, wherein a wireless association between the first wireless node and the third wireless node is with respect to the second wireless node; and forwarding the obtained encrypted payload to the third wireless node.

Another innovative aspect of the subject matter described in this disclosure can be implemented at an apparatus for wireless communication. The apparatus includes a memory including instructions; and one or more processors, individually or collectively, configured to execute the instructions and cause the apparatus to: encrypt a payload of a MPDU; and output to a second wireless node, the encrypted payload destined for a first wireless node, wherein the apparatus and the first wireless node have an end-to-end wireless association.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
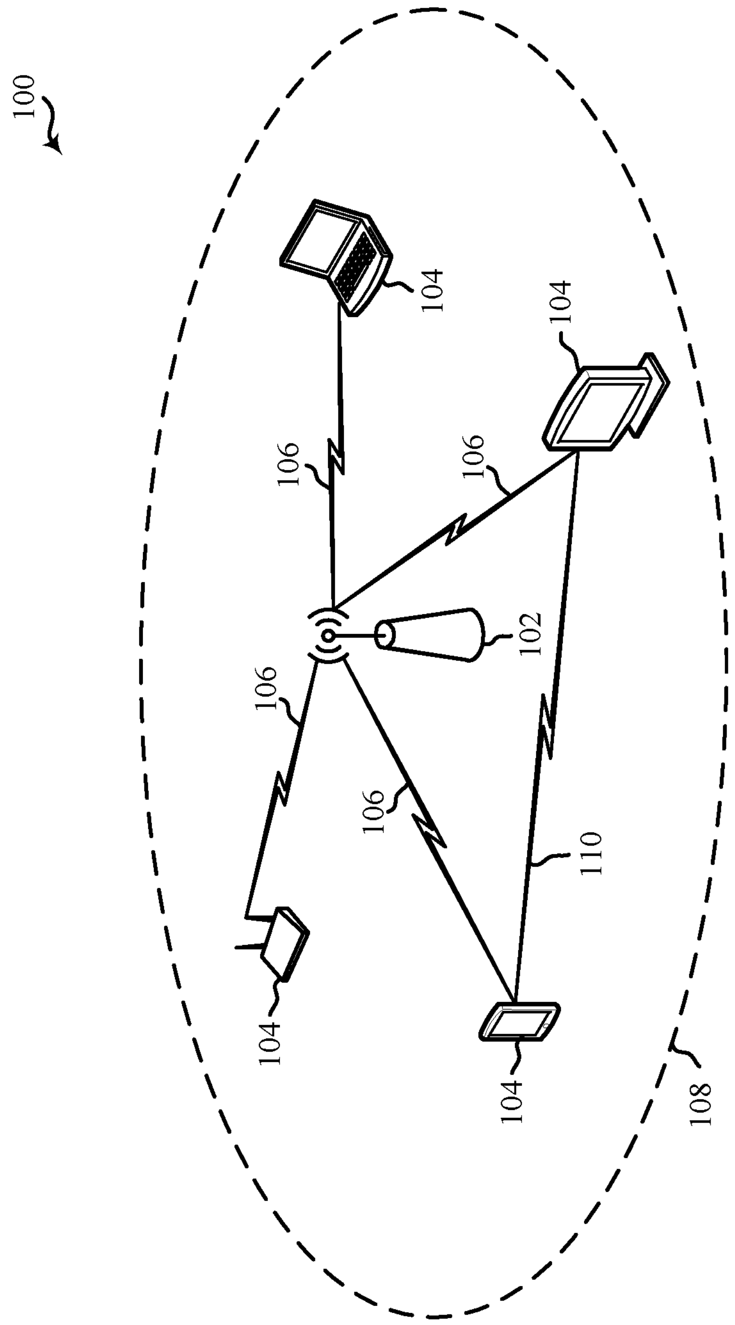
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless communication. Some aspects more specifically relate to a multi-link device (MLD) based relay architecture.

In some cases, a single access point (AP) may not be able to provide Wi-Fi coverage for a whole building (e.g., a single-family home, a shopping mall, etc.). The AP may be a networking device (e.g., which may provide access to a local area network (LAN) or a wide area network (WAN)). The AP may be a root AP (which has access to the LAN or the WAN) or a relay AP (which may not have access to the LAN or the WAN). In such cases, a system (e.g., a mesh system) with multiple APs is implemented to provide enough Wi-Fi coverage. The mesh system may generally include a root AP, a wireless station (STA) (i.e., end client STA), and at least one satellite AP (e.g., which operates as a relay AP between (e.g., for a transmission path between) the root AP and the wireless STA).

The root AP is configured to encrypt a payload of a medium access control (MAC) protocol data unit (MPDU), and then transmit the encrypted payload to the wireless STA via the satellite AP. Upon receiving the encrypted payload from the root AP, the satellite AP performs decryption of the encrypted payload and re-encryption of unencrypted payload. The satellite AP then transmits re-encrypted payload to the wireless STA. The wireless STA decrypts the re-encrypted payload received from the satellite AP.

In some cases, when there are multiple satellite APs operating as relay APs between the root AP and the wireless STA, decryption and re-encryption operations performed at each satellite AP may take a lot of time, processing, and power. Accordingly, a lot of delay is incurred at each satellite AP, which adds to overall end-to-end delay for transmission of the encrypted payload from the root AP to the wireless STA.

Techniques described herein may reduce end-to-end latency during the transmission of the encrypted payload from the root AP to the wireless STA via the satellite AP. For example, the satellite AP may be configured to receive the encrypted payload from the root AP, and then forward the received encrypted payload (e.g., without making any changes or any substantial changes to the received encrypted payload) to the wireless STA. For example, the satellite AP may forward the received encrypted payload to the wireless STA, without decrypting the received encrypted payload and re-encrypting unencrypted payload at the satellite AP. In some cases, the root AP and the wireless STA may not be in a communication range (e.g., there may not be any link (e.g., a direct link) between the root AP and the wireless STA). In some cases, the satellite AP and the wireless STA may be in a communication range (e.g., there may be some link (e.g., a direct link) between the satellite AP and the wireless STA). In some cases, the satellite AP and the root AP may be in a communication range (i.e., there may be some link (e.g., a direct link) between the satellite AP and the root AP).

Particular aspects of the subject matter described in this disclosure can be implemented to realize one or more of the following potential advantages. In some examples, the described techniques can be used to reduce overall latency time, since no decryption and re-encryption of the encrypted payload is occurring at the satellite AP. In some examples, the described techniques may also provide seamless roaming for the wireless STA and other wireless nodes. For example, since the association of the wireless STA and other wireless nodes is with respect to the root AP, the wireless STA can seamlessly roam to other relay APs without requiring reassociation. That is, an on-going session between the different wireless nodes will not be disrupted.

Example Wireless Communication Network

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless access point (AP) 102 and multiple wireless stations (STAs) 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Figure 2:
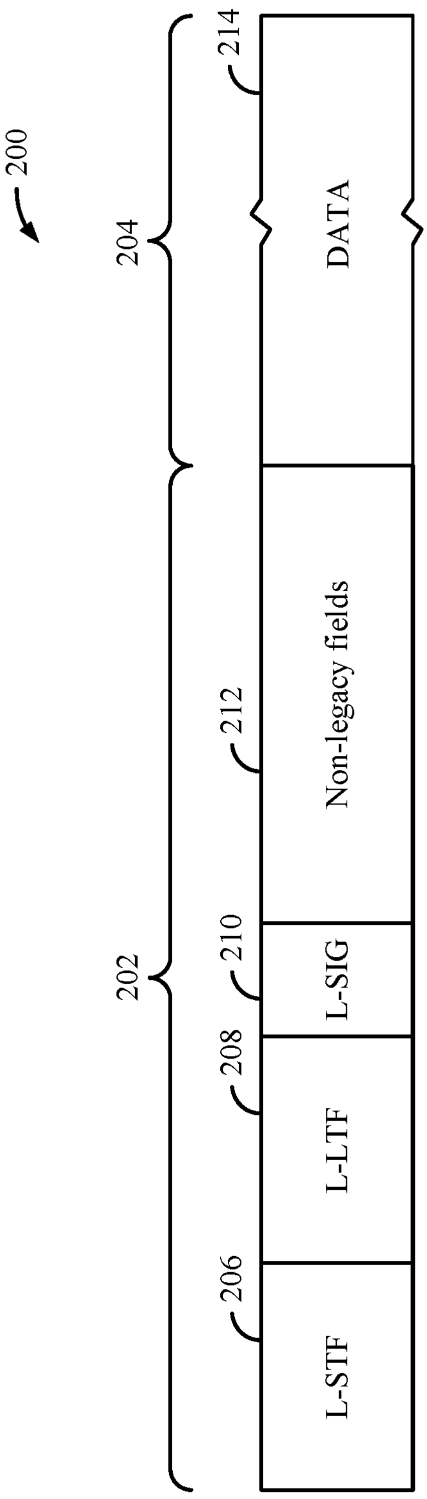
FIG. 2 shows an example protocol data unit (PDU) usable for communications between a wireless access point (AP) and one or more wireless stations (STAs).

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
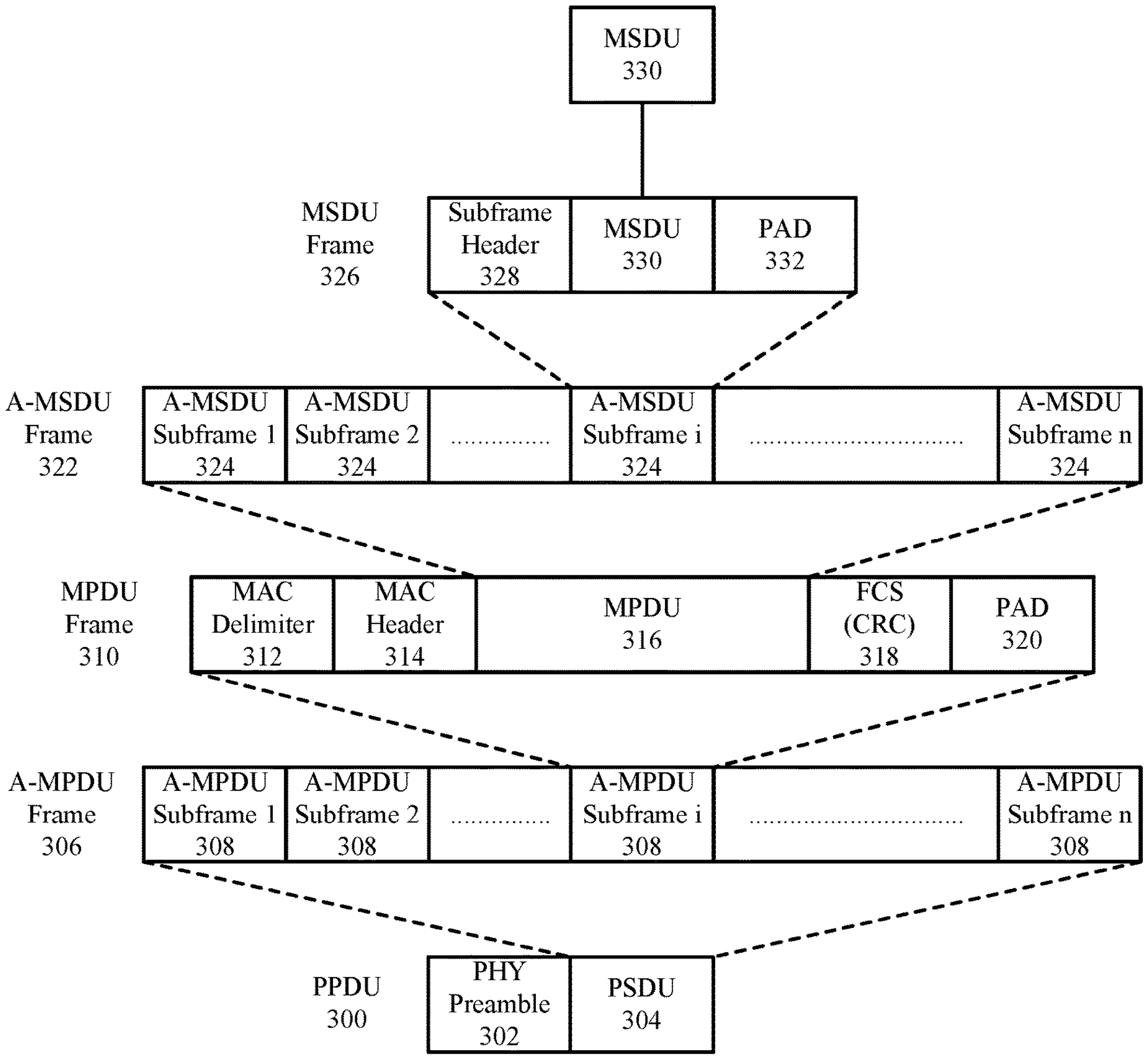
FIG. 3 shows a hierarchical format of an example physical layer PDU (PPDU) usable for communications between a wireless AP and one or more wireless STAs.

FIG. 3 shows a hierarchical format of an example PPDU usable for communications between a wireless AP 102 and one or more wireless STAs 104. As described, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which includes the data portion ("payload" or "frame body") of the MPDU frame 310. Each MPDU frame 310 also may include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Some APs and STAs may implement techniques for spatial reuse that involve participation in a coordinated communication scheme. According to such techniques, an AP may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP, The sharing AP may allocate the time or frequency segments to itself or to one or more of the shared APs. For example, each shared AP may utilize a partial TXOP assigned by the sharing AP for its uplink or downlink communications with its associated STAs.

In some examples of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

In this manner, the sharing AP's acquisition of the TXOP enables communication between one or more additional shared APs and their respective BSSs, subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to conventional CSMA/CA or EDCA techniques. Additionally, by enabling a group of APs associated with different BSSs to participate in a coordinated AP transmission session, during which the group of APs may share at least a portion of a single TXOP obtained by any one of the participating APs, such techniques may increase throughput across the BSSs associated with the participating APs and may also achieve improvements in throughput fairness. Furthermore, with appropriate selection of the shared APs and the scheduling of their respective time or frequency resources, medium utilization may be maximized or otherwise increased while packet loss resulting from overlapping BSS (OBSS) interference (i.e., interference from an overlapping BSS) is minimized or otherwise reduced. Various implementations may achieve these and other advantages without requiring that the sharing AP or the shared APs be aware of the STAs associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, an RX power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may then be allocated resources during the TXOP as described above.

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, If a receiving device cannot properly decode (and cannot correct the errors) a first HARQ transmission received from the transmitting device, the receiving device may transmit a HARQ feedback message to the transmitting device (for example, a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of the transmission to further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 4:
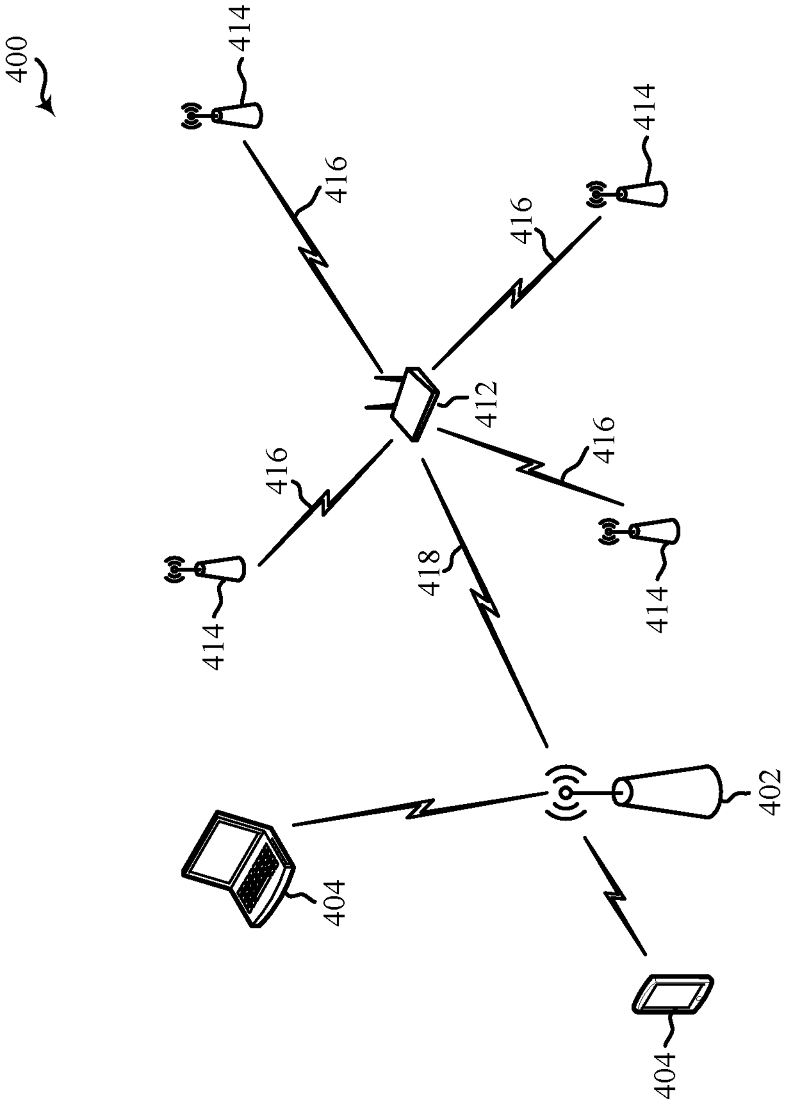
FIG. 4 shows a pictorial diagram of another example wireless communication network.

FIG. 4 shows a pictorial diagram of another example wireless communication network 400. According to some aspects, the wireless communication network 400 can be an example of a mesh network, an IoT network or a sensor network in accordance with one or more of the IEEE 802.11 family of wireless communication protocol standards (including the 802.11ah amendment). The wireless network 400 may include multiple wireless communication devices 414. The wireless communication devices 414 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 414 sense, measure, collect or otherwise obtain and process data and then transmit such raw or processed data to an intermediate device 412 for subsequent processing or distribution. Additionally or alternatively, the intermediate device 412 may transmit control information, digital content (for example, audio or video data), configuration information or other instructions to the wireless communication devices 414. The intermediate device 412 and the wireless communication devices 414 can communicate with one another via wireless communication links 416. In some examples, the wireless communication links 416 include Bluetooth links or other PAN or short-range communication links.

In some examples, the intermediate device 412 also may be configured for wireless communication with other networks such as with a Wi-Fi WLAN or a wireless (for example, cellular) wide area network (WWAN), which may, in turn, provide access to external networks including the Internet. For example, the intermediate device 412 may associate and communicate, over a Wi-Fi link 418, with an AP 402 of a WLAN network, which also may serve various STAs 404. In some examples, the intermediate device 412 is an example of a network gateway, for example, an IoT gateway. In such a manner, the intermediate device 412 may serve as an edge network bridge providing a Wi-Fi core backhaul for the IoT network including the wireless communication devices 414. In some examples, the intermediate device 412 can analyze, preprocess and aggregate data received from the wireless communication devices 414 locally at the edge before transmitting it to other devices or external networks via the Wi-Fi link 418. The intermediate device 412 also can provide additional security for the IoT network and the data it transports.

Aspects of transmissions may vary according to a distance between a transmitter (for example, an AP 102 or a STA 104) and a receiver (for example, another AP 102 or STA 104). Wireless communication devices may generally benefit from having information regarding the location or proximities of the various STAs 104 within the coverage area. In some examples, relevant distances may be determined (for example, calculated or computed) using RTT-based ranging procedures. Additionally, in some examples, APs 102 and STAs 104 may perform ranging operations. Each ranging operation may involve an exchange of fine timing measurement (FTM) frames (such as those defined in the 802.11az amendment to the IEEE family of wireless communication protocol standards) to obtain measurements of RTT transmissions between the wireless communication devices.

Figure 5:
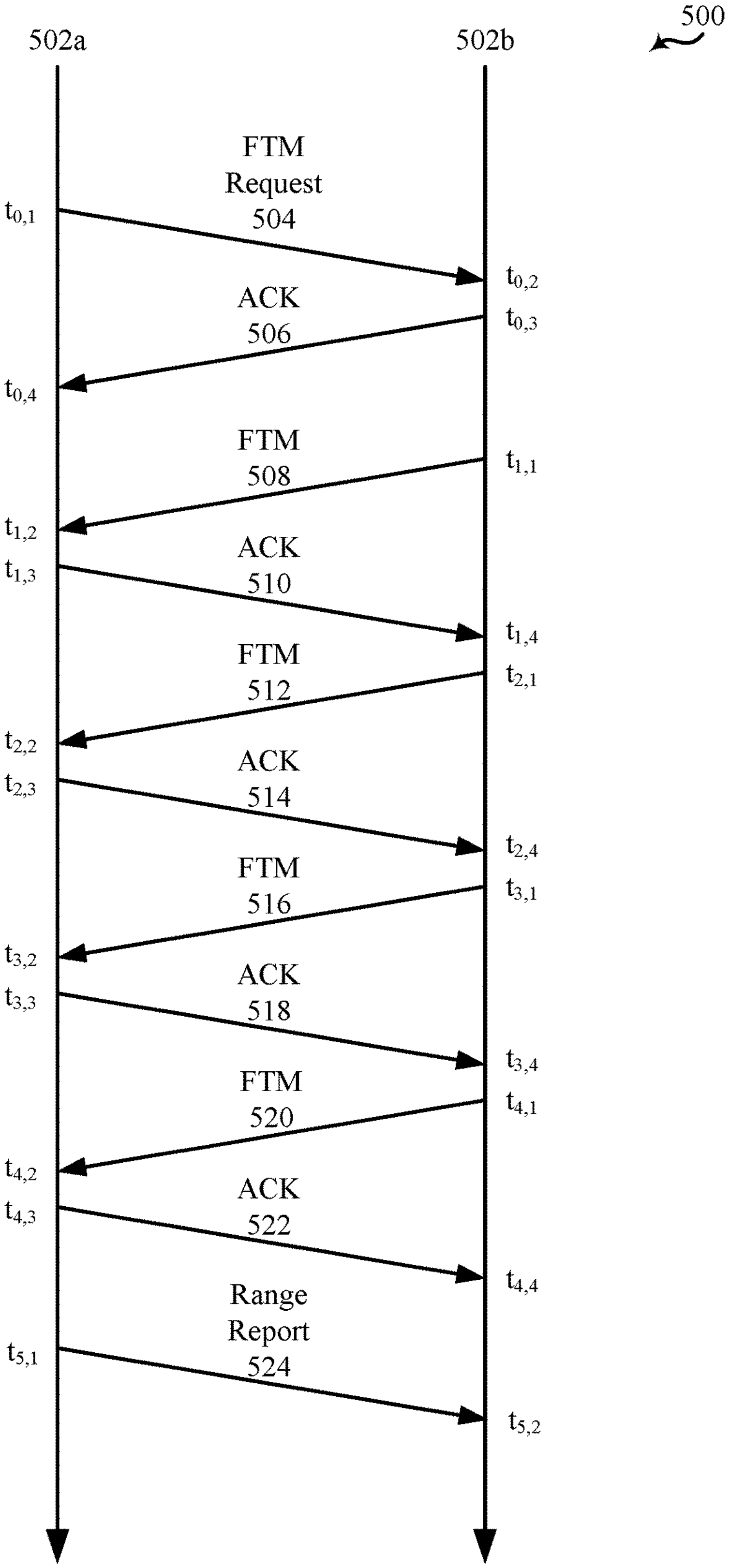
FIG. 5 shows a timing diagram illustrating an example process for performing a ranging operation.

FIG. 5 shows a timing diagram illustrating an example process for performing a ranging operation 500. The process for the ranging operation 500 may be conjunctively performed by two wireless communication devices 502*a* and 502*b* in accordance with the IEEE 802.11REVme standards, which may each be an example of an AP 102 or a STA 104.

The ranging operation 500 begins with the first wireless communication device 502*a* transmitting an initial FTM range request frame 504 at time $t_{0,1}$. Responsive to successfully receiving the FTM range request frame 504 at time $t_{0,2}$, the second wireless communication device 502*b* responds by transmitting a first ACK 506 at time $t_{0,3}$, which the first wireless communication device 502*a* receives at time $t_{0,4}$. The first wireless communication device 502*a* and the second wireless communication device 502*b* then exchange one or more FTM bursts, which may each include multiple exchanges of FTM action frames (hereinafter simply "FTM frames") and corresponding ACKs. One or more of the FTM request frame 504 and the FTM action frames (hereinafter simply "FTM frames") may include FTM parameters specifying various characteristics of the ranging operation 500.

In the example shown in FIG. 5, in a first exchange, beginning at time $t_{1,1}$, the second wireless communication device 502*b* transmits a first FTM frame 508. The second wireless communication device 502*b* records the time $t_{1,1}$ as the time of departure (TOD) of the first FTM frame 508. The first wireless communication device 502*a* receives the first FTM frame 508 at time $t_{1,2}$ and transmits a first acknowledgement frame (ACK) 510 to the second wireless communication device 502*b* at time $t_{1,3}$. The first wireless communication device 502*a* records the time $t_{1,2}$ as the time of arrival (TOA) of the first FTM frame 508, and the time $t_{1,3}$ as the TOD of the first ACK 510. The second wireless communication device 502*b* receives the first ACK 510 at time $t_{1,4}$ and records the time $t_{1,4}$ as the TOA of the first ACK 510.

Similarly, in a second exchange, beginning at time $t_{2,1}$, the second wireless communication device 502*b* transmits a second FTM frame 512. The second FTM frame 512 includes a first field indicating the TOD of the first FTM frame 508 and a second field indicating the TOA of the first ACK 510. The first wireless communication device 502*a* receives the second FTM frame 512 at time $t_{2,2}$ and transmits a second ACK 514 to the second wireless communication device 502*b* at time $t_{2,3}$. The second wireless communication device 502*b* receives the second ACK 514 at time $t_{2,4}$. Similarly, in a third exchange, beginning at time $t_{3,1}$, the second wireless communication device 502*b* transmits a third FTM frame 516. The third FTM frame 516 includes a first field indicating the TOD of the second FTM frame 512 and a second field indicating the TOA of the second ACK 514. The first wireless communication device 502*a* receives the third FTM frame 516 at time $t_{3,2}$ and transmits a third ACK 518 to the second wireless communication device 502*b* at time $t_{3,3}$. The second wireless communication device 502*b* receives the third ACK 518 at time $t_{3,4}$. Similarly, in a fourth exchange, beginning at time $t_{4,1}$, the second wireless communication device 502*b* transmits a fourth FTM frame 520. The fourth FTM frame 520 includes a first field indicating the TOD of the third FTM frame 516 and a second field indicating the TOA of the third ACK 518. The first wireless communication device 502*a* receives the fourth FTM frame 520 at time $t_{4,2}$ and transmits a fourth ACK 522 to the second wireless communication device 502*b* at time $t_{4,3}$. The second wireless communication device 502*b* receives the fourth ACK 522 at time $t_{4,4}$.

The first wireless communication device 502*a* determines (for example, obtains, identifies, ascertains, calculates, or computes) a range indication in accordance with the TODs and TOAs. For example, in implementations or instances in which an FTM burst includes four exchanges of FTM frames, the first wireless communication device 502*a* may determine (for example, obtain, identify, ascertain, calculate, or compute) a round trip time (RTT) between itself and the second wireless communication device 502*b* in accordance with Equation 1.

$$RTT = \frac{1}{3}\left(\sum_{k=1}^{3} t_{4,k} - \sum_{k=1}^{3} t_{1,k}\right) - \left(\sum_{k=1}^{3} t_{3,k} - \sum_{k=1}^{3} t_{2,k}\right) \tag{1}$$

In some implementations, the range indication is the RTT. Additionally or alternatively, in some implementations, the first wireless communication device 502*a* may determine (for example, obtain, identify, ascertain, calculate, or compute) an actual approximate distance between itself and the second wireless communication device 502*b*, for example, by multiplying the RTT by an approximate speed of light in the wireless medium. In such instances, the range indication may additionally or alternatively include the distance value. Additionally or alternatively, the range indication may include an indication as to whether the second wireless communication device 502*b* is within a proximity (for example, a service discovery threshold) of the first wireless communication device 502*a* in accordance with the RTT. In some implementations, the first wireless communication device 502*a* may then transmit the range indication to the second wireless communication device 502*b*, for example, in a range report 524 at time $t_{5,1}$, which the second wireless communication device receives at time $t_{5,2}$.

Example Multi-Link Devices

Some wireless networks (e.g., extremely high throughput (EHT) networks) may allow multi-link devices (MLDs) to communicate via two or more communication links simultaneously, for example, using multi-link aggregation (MLA).

A MLD refers to a single device or equipment that includes two or more station (STA) instances or entities, implemented in a physical (PHY)/medium access control (MAC) layer and configured to communicate on separate wireless links. In some cases, each MLD may include a single higher layer entity, such as a MAC service access point (SAP) that may assign MAC protocol data units (MPDUs) for transmission by the separate STA instances.

In some wireless networks, an access point (AP) MLD may communicate with a non-AP MLD. The AP MLD and the non-AP MLD may include STA entities (hereinafter also referred to simply as STAs or wireless STAs) that may communicate with associated STAs of another MLD. In the AP MLD, the STAs may be AP STAs (e.g., STAs serving as APs or simply APs). In the non-AP MLD, the STAs may be non-AP STAs (e.g., STAs not serving as APs).

In some wireless networks, a multi-link operation (MLO) framework accounts for MLDs with a variety of capabilities, including, for example, MLDs with loose coordination between STA instances. This may be the case, for example, when (for example, for performance and modular efficiency) multiple STAs of the MLD are implemented using a separate hardware (e.g., different chips or chipsets) and a speed of communication between the hardware of the different STAs within the MLD is limited. In other words, AP STAs in lower MAC layer devices (e.g., STA instances) may not have a fast communication link between them. However, this may not be the case on the non-AP MLD side, in which the hardware for both STA instances of the non-AP MLD is implemented via a same chip/chipset. In contrast, an AP MLD may include STA instances implemented on different chips.

Example Easy Mesh System

In some cases (e.g., in a single-family home), a single access point (AP) may not be able to provide enough coverage (e.g., Wi-Fi coverage) for a whole home (e.g., including yards). In such cases, an easy mesh system with multiple APs is implemented to provide enough Wi-Fi coverage for the whole home. The easy mesh system may be a wireless distribution system (WDS) using a four-address mode in a backhaul with a tree and/or a daisy-chained topology.

Figure 6:
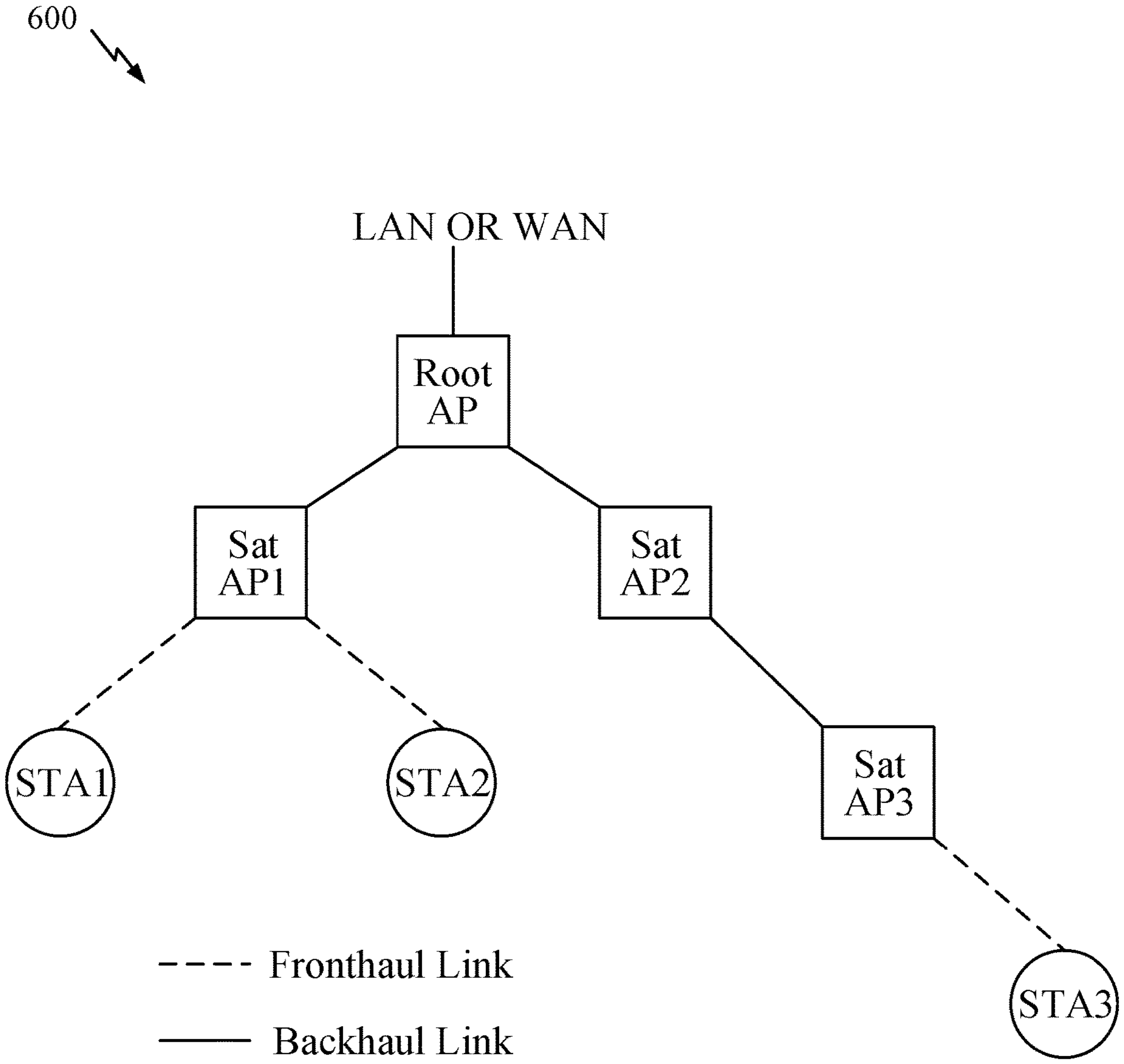
FIG. 6 shows a pictorial diagram of an example easy mesh system including wireless nodes.

FIG. 6 shows a pictorial diagram of an example easy mesh system 600. The easy mesh system 600 includes multiple wireless nodes. The wireless nodes include a root AP, which has access to a local area network (LAN) or a wide area network (WAN).

The wireless nodes also include satellite APs (e.g., a first satellite AP (sat AP1), a second satellite AP (sat AP2), a third satellite AP (sat AP3)) and wireless stations (STAs). The wireless STAs include a first wireless STA (STA1), a second wireless STA (STA2), and a third wireless STA (STA3).

Each satellite AP is an intermediate AP between (e.g., for a transmission path between) the root AP (or another satellite AP) and a wireless STA. Multiple APs such as the root AP and the satellite APs are connected via Ethernet or Wi-Fi to form a backhaul. Each satellite AP also has a fronthaul that may serve wireless STAs (i.e., end client STAs) usually on a different channel than the backhaul.

The easy mesh system 600 provides one or more mechanisms to enable communications between: the LAN (or the WAN) and any wireless STA on a wireless network (e.g., a single-family home wireless network), any two wireless STAs within the wireless network, and any two APs within the wireless network (e.g., for a controller at the root AP to control one or more satellite APs).

Figure 7:
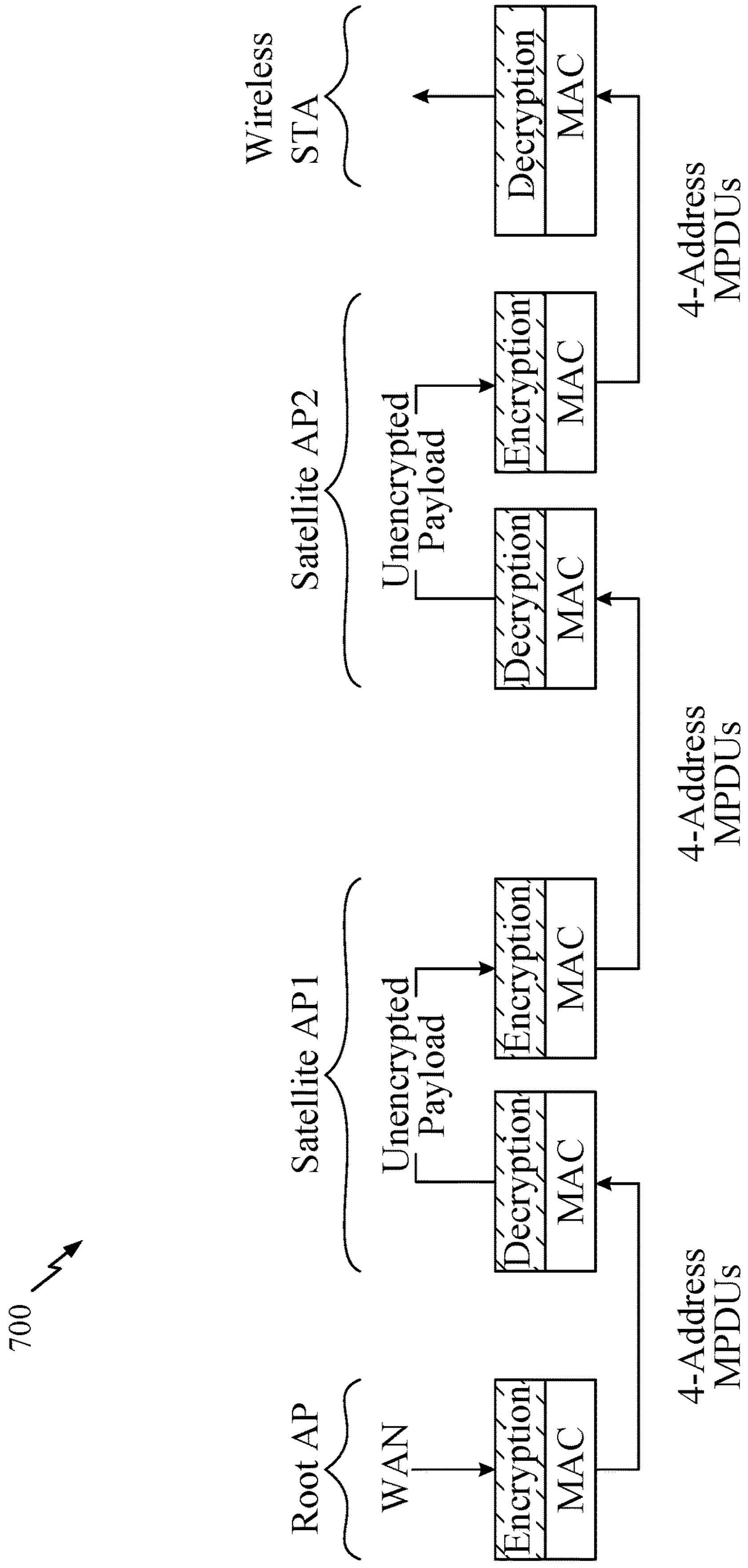
FIG. 7 shows a pictorial diagram of operations performed at each wireless node of an example easy mesh system.

FIG. 7 shows a pictorial diagram of operations at each wireless node of an example easy mesh system 700. The easy mesh system 700 includes a root AP, a first satellite AP (satellite AP1), a second satellite AP (satellite AP2), and a wireless STA. The first satellite AP and the second satellite AP are positioned between the root AP and the wireless STA.

Each satellite AP may include a non-AP STA instance. The non-AP STA instance corresponds to a backhaul STA (bSTA). The bSTA associates the satellite AP with an upstream satellite AP.

Each satellite AP may also include an upstream AP instance. The upstream AP instance corresponds to a backhaul basic service set (bBSS). The bBSS serves a downstream bSTA.

In some cases, when there may be multiple links between multiple wireless nodes of the easy mesh system 700 and a multi-link operation (MLO) is used between the root AP and the first satellite AP, a first bSTA (bSTA1) associated with the first satellite AP may be a non-AP multi-link device (MLD) and an upstream AP (e.g., the root AP) may be an AP MLD. In some cases, fronthaul links (e.g., a link between an AP and end client STA) and backhaul links (e.g., a link between APs) may be on different channels.

The root AP generates (or forms) a medium access control (MAC) header corresponding to a MAC protocol data unit (MPDU). The MAC header may be a four-address MAC header. The four-address MAC header indicates a transmitter address (TA) corresponding to an immediate sender of the MPDU (e.g., rootAP_basic service set identifier (BSSID)), a receiver address (RA) corresponding to an immediate receiver of the MPDU (e.g., bSTA1_MAC), a source address (SA) corresponding to an original source of the MPDU (e.g., rootAP_BSSID), and a destination address (DA) corresponding to a final recipient of the MPDU (e.g., destSTA_MAC).

The root AP encrypts a payload of the MPDU using a pairwise transient key (PTK) (e.g., and a sequence number (SN) associated with the MPDU as well as a packet number (PN) associated with the MPDU). The PTK is associated with the root AP and the first bSTA associated with a downstream satellite AP (e.g., the first satellite AP). The root AP transmits the encrypted payload of the MPDU to the first bSTA. In some cases, since the root AP uses a single mobility domain (SMD) AP MLD MAC address and a non-AP MLD MAC address of the wireless STA (and not link-specific MAC addresses, which change per hop) as inputs to adjoint algorithmic differentiation (AAD) computation when encrypting the payload of the MPDU, the relaying does not affect the decryption (e.g., since the wireless STA knows the SMD AP MLD MAC address and the non-AP MLD MAC address of the wireless STA, and the wireless STA will be able to decrypt one or more MPDUs).

The first bSTA decrypts the encrypted payload of the MPDU and then places the decrypted payload of the MPDU in a buffer associated with the first satellite AP. In some cases, the first bSTA may maintain a local block acknowledgement (BA) scoreboard and send a BA to the root AP to indicate which MPDUs (along with their SNs) of the MPDU have not been received, so that the root AP can retransmit the indicated MPDUs to the first bSTA.

In some cases, there may be an end-to-end BA session between some devices of the system 700. For example, there may be the end-to-end BA session between the root AP and the wireless STA. In such cases, there may be no BA session between intermediate APs (such as the first satellite AP and the second satellite AP or between the second satellite AP and a third satellite AP (e.g., when the wireless STA is connected to or associated with the third satellite AP)). However, in some scenarios, the intermediate APs may maintain some type of light BA session (e.g., a loose or a floating BA session) for a certain (end-to-end) flow from the root AP to the wireless STA. That is, the BA session corresponding to the intermediate APs may not be bound by a certain window size (e.g., which is established for a BA agreement used for processing BAs) and would be transient.

The first bSTA internally forwards the decrypted payload of the MPDU to a first fronthaul BSS (fBSS) associated with the first satellite AP for further transmission.

The first fBSS generates (or forms) a new four-address MAC header based on (or using information associated with) at least new values of TA and RA addresses. The new four-address MAC header indicates a new TA corresponding to an immediate sender of the MPDU (e.g., first fBSS_BSSID), a new RA corresponding to an immediate receiver of the MPDU (e.g., bSTA2_MAC), the SA (e.g., rootAP_BSSID), and the DA (e.g., destSTA_MAC).

The first fBSS encrypts the decrypted payload of the MPDU using a PTK e.g., and the SN as well as the PN) associated with the first satellite AP and a second bSTA (bSTA2) associated with a downstream satellite AP (e.g., the second satellite AP). The first fBSS transmits the encrypted payload of the MPDU (along with the new MAC header) to the second bSTA.

The second bSTA receives and decrypts the encrypted payload of the MPDU and then places the decrypted payload of the MPDU in a buffer associated with the second satellite AP. In some cases, the second bSTA may maintain a local BA scoreboard and send a BA to the first satellite AP to indicate which MPDUs (along with their SNs) of the MPDU have not been received, so that the first satellite AP can retransmit the indicated MPDUs to the second bSTA.

The second bSTA internally forwards the decrypted payload of the MPDU to a second fBSS associated with the second satellite AP for further transmission.

The second fBSS generates (or forms) a new four-address MAC header based on (or using information associated with) at least new values of TA and RA addresses. The new four-address MAC header indicates a new TA corresponding to an immediate sender of the MPDU (e.g., second fBSS_BSSID), a new RA corresponding to an immediate receiver of the MPDU (i.e., the wireless STA), the SA (e.g., rootAP_BSSID), and the DA (e.g., destSTA_MAC).

The second fBSS encrypts the decrypted payload of the MPDU using a PTK (e.g., and the SN as well as the PN) associated with the second satellite AP and the wireless STA.

The second fBSS transmits the encrypted payload of the MPDU (along with the new MAC header) to the wireless STA. The wireless STA receives and decrypts the encrypted payload of the MPDU.

In the easy mesh system 700, each satellite AP has to decrypt and re-encrypt received encrypted payloads of all MPDUs. Each satellite AP may also need to re-order the MPDUs before forwarding the MPDUs to other wireless nodes. In some cases, each satellite AP may also need to wait for channel access for transmission of the MPDUs to a bSTA of a subsequent satellite AP. All these operations at each satellite AP may take a lot of time. Consequently, a lot of delay is incurred by a relay operation performed at each hop (e.g., at each satellite AP), which adds to overall end-to-end delay for transmission of the encrypted payloads of the MPDUs received from the root AP to the wireless STA. Accordingly, there is a need for a technique to reduce end-to-end latency during the transmission of the encrypted payloads of the MPDUs from the root AP to the wireless STA.

Example Multi-Link Device (MLD) Based Relay Architecture

Techniques described herein may reduce end-to-end latency during a transmission of an encrypted payload of a medium access control (MAC) protocol data unit (MPDU) from a root access point (AP) to a wireless station (STA) via a satellite AP (i.e., a relay AP). For example, the satellite AP may be configured to receive the encrypted payload from the root AP, and then forward the received encrypted payload to the wireless STA, without decrypting the received encrypted payload and re-encrypting unencrypted payload at the satellite AP. The described techniques can be used to reduce overall latency time, since no decryption and re-encryption of the encrypted payload is occurring at the satellite AP. In some cases, the described techniques may also provide seamless roaming for the wireless STA and other wireless nodes. For example, since the association of the wireless STA and other wireless nodes is with respect to the root AP, the wireless STA can seamlessly roam to other relay APs without requiring reassociation. That is, an on-going session between the different wireless nodes will not be disrupted.

In certain aspects, an AP (e.g., the AP 102 depicted and described with respect to FIG. 1) may include multiple antennas to transmit and receive wireless communications. The AP may also include at least one processor (e.g., an application processor, a transmit processor, a receive processor, etc.) and a memory coupled with the processor. The AP further includes at least one external network interface that enables the AP to communicate with a core network or a backhaul network to gain access to external networks including the Internet. The external network interface may include one or both of a wired (for example, Ethernet) network interface and a wireless network interface. Each of the aforementioned components of the AP can communicate with other components of the AP directly or indirectly, over at least one bus.

Some aspects of the subject matter described in this disclosure may be further understood with reference to FIGS. 8-15.

Figure 8:
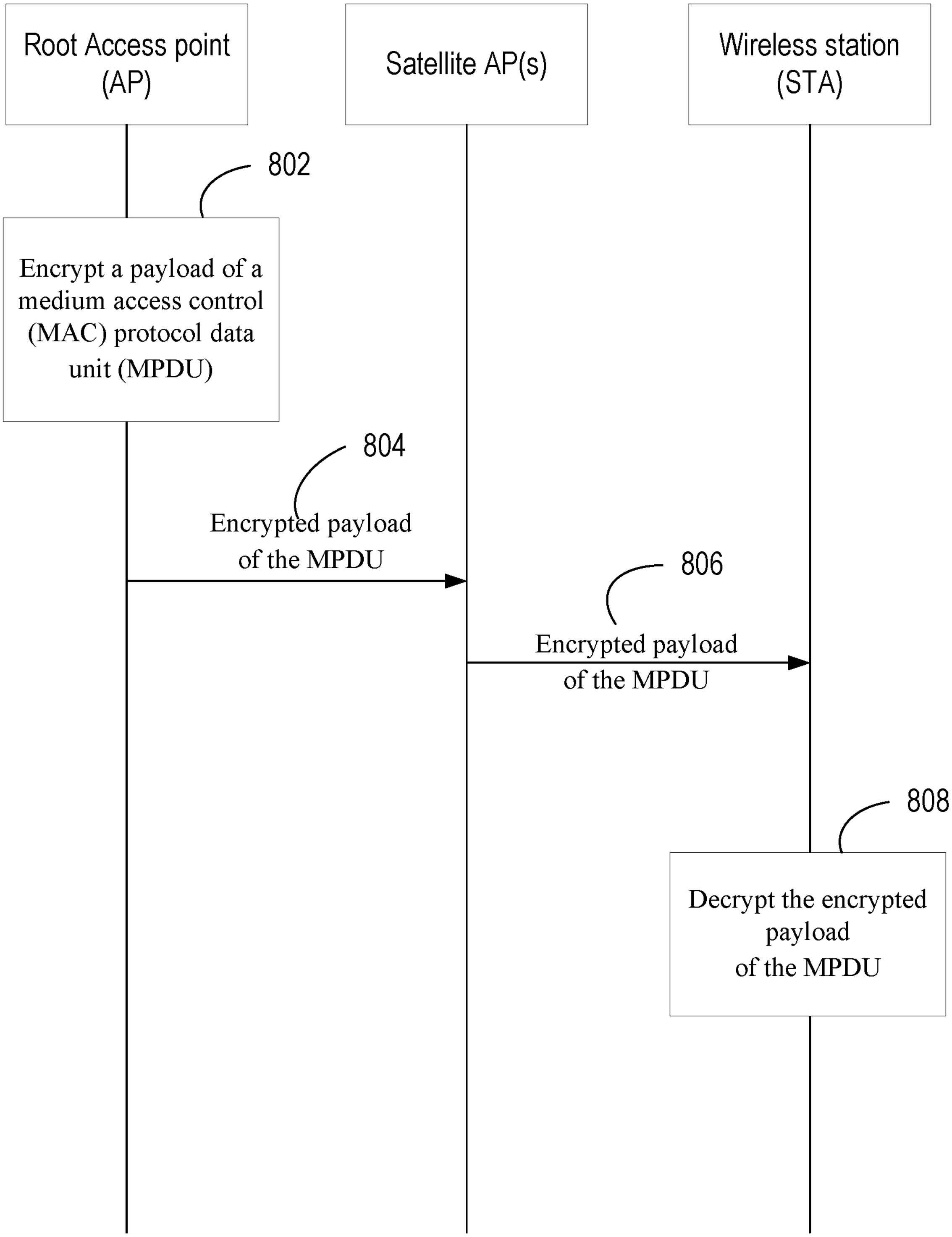
FIG. 8 shows a call flow diagram illustrating example communication among wireless nodes of an easy mesh system.

FIG. 8 shows a call flow diagram illustrating example communication among wireless nodes of an easy mesh system. The wireless nodes include at least a root AP (e.g., such as the wireless AP 102 depicted and described with respect to FIG. 1), a satellite AP (e.g., such as the wireless AP 102 depicted and described with respect to FIG. 1), and a wireless STA (e.g., such as the wireless STA 104 depicted and described with respect to FIG. 1). In some cases, the different wireless nodes may include multiple satellite APs, which may communicate with and are directly or indirectly associated with the root AP and the wireless STA.

At 802, the root AP encrypts a payload of a MPDU.

At 804, the root AP transmits the encrypted payload of the MPDU to a satellite AP.

At 806, the satellite AP forwards the encrypted payload of the MPDU received from the root AP to the wireless STA, without decrypting the encrypted payload of the MPDU and re-encrypting unencrypted payload of the MPDU at the satellite AP.

At 808, the wireless STA receives and decrypts the encrypted payload of the MPDU received from the satellite AP.

In certain aspects, the wireless STA may encrypt a payload of a MPDU. The wireless STA may transmit the encrypted payload of the MPDU to a satellite AP. The satellite AP forwards the encrypted payload of the MPDU received from the wireless STA to a root AP, without decrypting the encrypted payload of the MPDU and re-encrypting unencrypted payload of the MPDU at the satellite AP. The root AP receives and decrypts the encrypted payload of the MPDU received from the satellite AP.

Figure 9:
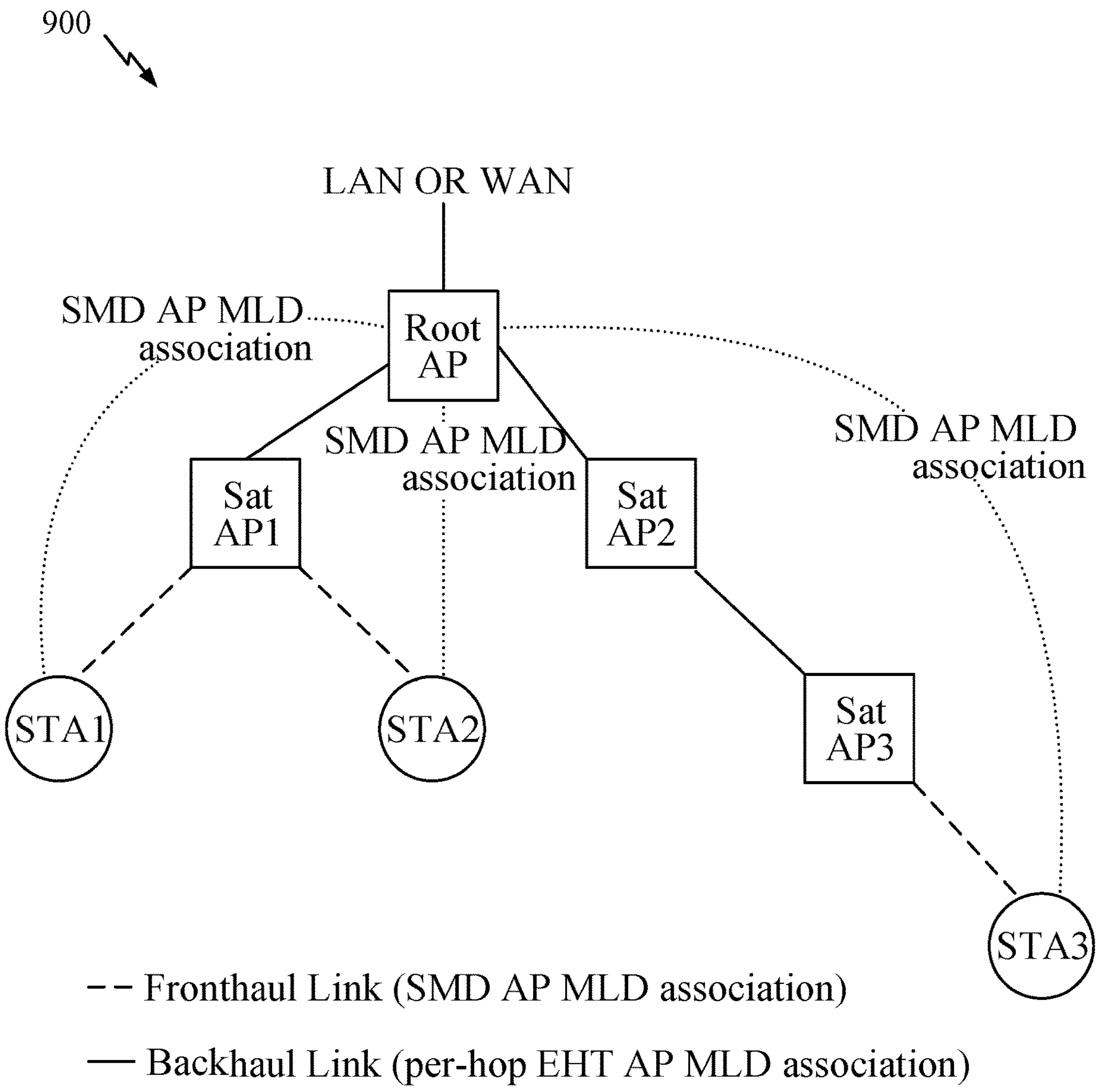
FIG. 9 shows a pictorial diagram of links and associations between wireless nodes of an example easy mesh system.

FIG. 9 shows a pictorial diagram of links and associations (e.g., some of which may be end-to-end links and associations) between wireless nodes or devices of an easy mesh system 900. The easy mesh system 900 includes a root AP, multiple satellite APs (e.g., a first satellite AP (SAT AP1), a second satellite AP (SAT AP2), a third satellite AP (SAT AP3)), and multiple wireless STAs (e.g., a first wireless STA (STA1), a second wireless STA (STA2), a third wireless STA (STA3)). Each wireless node may be configured to transmit and/or receive one or more MPDUs.

The root AP may be configured (or act) as a single mobility domain (SMD) AP multi-link device (MLD) that has access to a local area network (LAN) and/or a wide area network (WAN).

Each satellite AP (which may be an end client STA) of the easy mesh system 900 may be associated with the SMD AP MLD. For example, all fronthaul basic service sets (BSSs) of the satellite APs may be APs affiliated with the SMD AP MLD. In one example, the SMD AP MLD may manage (e.g., operations, associations, links, etc.) of each satellite AP of the easy mesh system 900. In another example, the SMD AP MLD may manage (e.g., operations, associations, links, etc.) of at least one satellite AP of the easy mesh system 900.

Each wireless STA of the easy mesh system 900 may be configured as a non-AP MLD. For example, each wireless STA may be a ultra high reliability (UHR) non-AP MLD that supports UHR seamless roaming, and is associated with the SMD AP MLD. In one example, the SMD AP MLD may manage (e.g., operations, associations, links, etc.) of each wireless STA of the easy mesh system 900. In another example, the SMD AP MLD may manage (e.g., operations, associations, links, etc.) of at least one wireless STA of the easy mesh system 900.

In certain aspects, to support seamless roaming between the different wireless nodes, each wireless STA of the easy mesh system 900 may have an end-to-end association (e.g., wireless association or any other type of association) with the root AP. In some cases, at least one wireless STA of the easy mesh system 900 may have an end-to-end association (e.g., wireless association or any other type of association) with the root AP. The end-to-end association between the wireless STA and the root AP may enable intermediate nodes such as satellite APs to directly forward received data (including encrypted data) from a source device (e.g., the root AP) to a final destination device (e.g., the wireless STA) without performing any encryption/decryption operations at its end. In some cases, information and/or keys needed to perform such encryption/decryption operations may be associated with or available at only the source device and the destination device.

In certain aspects, a wireless association between each satellite AP and the wireless STA is with respect to the root AP. This may imply that even though the wireless STA may be served (e.g., receive data including encrypted data) from any satellite AP, however, the wireless STA may always be associated with the root AP. Accordingly, the wireless device may be able to move from one satellite AP to another satellite AP (to receive and/or transmit data to these satellite APs) without requiring any association or re association with these satellite APs, since the main association context between these satellite APs and the wireless STA is with respect to the root AP. The root AP also manages all the satellite APs.

In certain aspects, a link between the first satellite AP and the first wireless STA may be a fronthaul link (e.g., based on or as per the SMD AP MLD association). The link between the first satellite AP and the second wireless STA may also be the fronthaul link.

In certain aspects, a link between the root AP and the first satellite AP may be a backhaul link (e.g., based on or as per-hop extremely high throughput (EHT) AP MLD association). The link between the root AP and the second satellite AP may also be the backhaul link. The link between the second satellite AP and the third satellite AP may also be the backhaul link.

Each satellite AP may be associated with or includes a non-AP STA instance (such as a backhaul STA (bSTA)). The bSTA may be associated with (or serves) one or more upstream APs. An upstream AP may be the root AP or another AP in-between the satellite AP and the root AP.

Each satellite AP may be associated with or includes a fronthaul BSS (fBSS). The fBSS associates the satellite AP with a wireless node such as the wireless STA.

Each satellite AP may be associated with or includes an upstream STA instance (e.g., a backhaul BSS (bBSS)). The bBSS may be associated with (or serves) one or more downstream bSTAs.

In certain aspects, all backhaul links (e.g., between the bBSS and the bSTA) may be MLD pairs (e.g., EHT MLD-level association), and this information corresponding to the MLD pairs may be provided to the wireless STAs (i.e., the information may be transparent to the end clients STAs).

In certain aspects, a payload of a MPDU is encrypted only at end points. For a downlink operation, only the root AP performs encryption of the payload of the MPDU using a pairwise transient key (PTK) associated with the SMD AP MLD and the non-AP MLD. For uplink operation, only the wireless STA performs the encryption of the payload of the MPDU using the PTK associated with the SMD AP MLD and the non-AP MLD.

In certain aspects, two wireless STAs may communicate with each other. For example, a first wireless STA may be associated with a first satellite AP and a second wireless STA may be associated with a second satellite AP. The first satellite AP and the second satellite AP may correspond to a same AP or different APs. The wireless STAs and/or the APs may further be associated with a root AP. The communication of one or more MPDUs between the first wireless STA and the second wireless STA may be via the root AP (e.g., since encryption is between the root AP and end client wireless STAs). In such cases, the first wireless STA may encrypt a payload (e.g., a first payload) of a MPDU (e.g., using a key established with at least the root AP) to generate a first encrypted payload. The first wireless STA may directly transmit the encrypted payload (e.g., the same first encrypted payload) to the root AP or via other wireless STAs (i.e., a multi-hop operation). In some cases, the multi-hop operation may indicate that a set of wireless devices or nodes may be able to communicate with each other directly or beyond their transmission or communication range by using one or more other nodes as one or more relay points. The multi-hop operation may have several advantages such as radio coverage extension, traffic load balancing, and energy consumption reduction.

The root AP may decrypt the encrypted payload (e.g., using the key established with at least the first wireless STA) and re-encrypt unencrypted payload (e.g., using another key established with at least the second wireless STA). The root AP may directly transmit the encrypted payload to the second wireless STA or via other wireless STAs (i.e., the multi-hop operation). The second wireless STA may decrypt the received encrypted payload (e.g., using the key established with at least the root AP).

In certain aspects, no encryption and/or decryption operations may be performed at the one or more satellite APs. For example, each satellite AP may: receive the encrypted payload of the MPDU (e.g., from the root AP or another upstream satellite AP), maintain and respond with a block acknowledgement (BA) feedback (e.g., corresponding to the encrypted payload of the MPDU to the root AP or the another upstream satellite AP) during a BA session, and forward the encrypted payload of the MPDU (e.g., with its Galois/counter mode protocol (GCMP) header) to a fronthaul BSS associated with the satellite AP for further transmission (e.g., without re-ordering of one or more MPDUs) to a downstream satellite AP or the wireless STA.

In certain aspects, a MPDU may be associated with a MAC header. The MAC header of the MPDU may be based on or associated with a transmitter address (TA) corresponding to an immediate sender of the MPDU, a receiver address (RA) corresponding to an immediate receiver of the MPDU, a source address (SA) corresponding to an original source of the MPDU, a destination address (DA) corresponding to a final recipient of the MPDU, a sequence number (SN) associated with the MPDU, and/or a packet number (PN) associated with the MPDU.

In certain aspects, a MPDU and/or a MAC header may be associated (and protected) with a message integrity code (MIC). The MIC may be based on or associated with the MAC header and/or a per-hop integrity key (e.g., a key associated with a satellite AP). The MPDU and/or the MAC header may need MIC-based protection because one or more fields of the MAC header are not encrypted, and these MAC header fields can be tampered by a potential attacker. To prevent any potential tampering of the MAC header fields, the MIC is generated and used. For example, a receiving satellite AP generates the MIC (e.g., based on or using information associated with the received MAC header fields) and then validates a MIC carried in a received MPDU frame. If the received MIC and the generated MIC match, it implies that the MPDU frame and the MAC header fields have not been tampered. In some cases, the MIC may be generated based on or using information associated with a security key (such as the PTK) established between the intermediate satellite APs. In some cases, since data portion associated with the MPDU is encrypted (e.g., between the root AP and the end client wireless STA), the data portion can not be tampered.

In certain aspects, the encrypted payload of the MPDU may be transmitted (e.g., without being re-encrypted by each satellite AP (i.e., at each hop) between the root AP and the wireless STA) to a next hop using (e.g., a four address mode along with a MAC header MIC (e.g., based on or per the per-hop integrity key, the PN and/or the SN) to protect the MAC header of the MPDU).

Figure 10A:
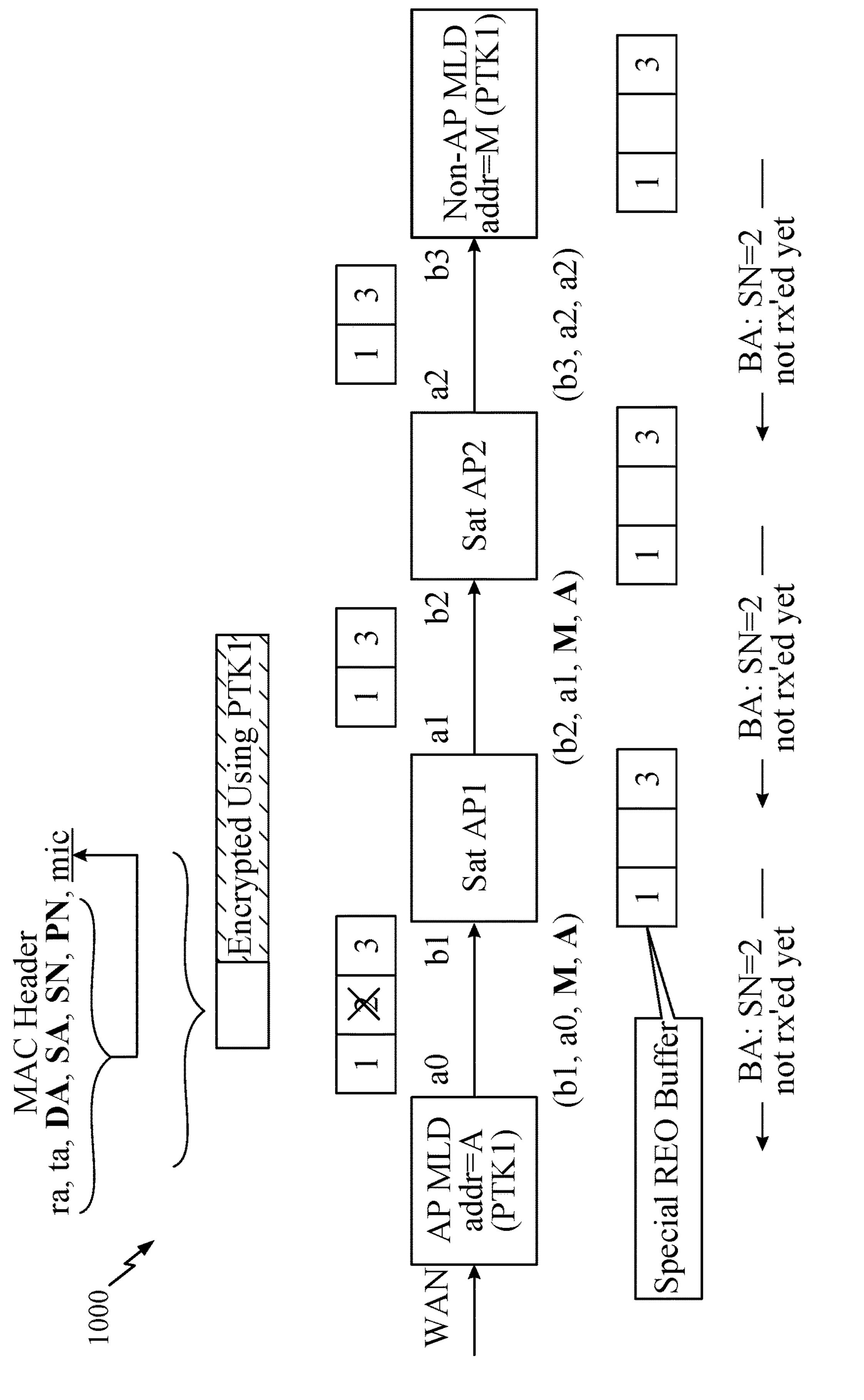
FIGS. 10A and 10B show a pictorial diagram of operations performed at each wireless node of an example easy mesh system.
Figure 10B:
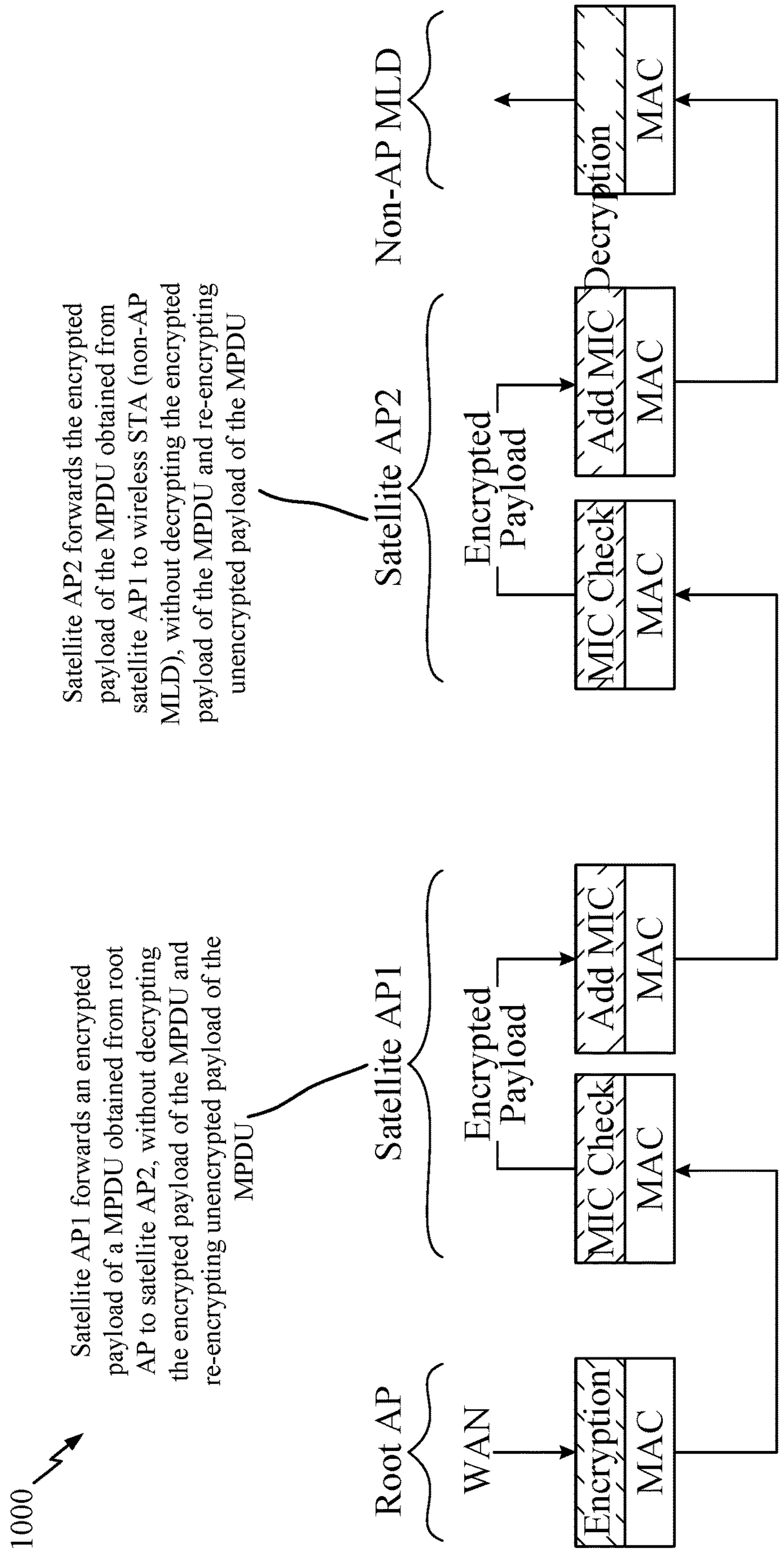

FIGS. 10A and 10B show a pictorial diagram of different operations at each wireless node of an easy mesh system 1000. The easy mesh system 1000 includes a root AP (e.g., AP MLD), a first satellite AP (e.g., sat AP1, satellite AP1), a second satellite AP (e.g., sat AP2, satellite AP2), and a wireless STA (e.g., non-AP MLD).

The root AP may encrypt a payload of at least one MPDU (e.g., of a plurality of MPDUs) using a PTK between the AP MLD and the non-AP MLD to generate an encrypted payload of the MPDU. In some cases, the root AP may encrypt the payload of the MPDU based on or using information associated with the PTK, a SN associated with the MPDU, and/or a PN associated with the MPDU.

The root AP may create a MAC header (e.g., four address MAC header) associated with the MPDU. The root AP may compute a MIC to protect the MAC header. For example, the root AP may compute the MIC based on or using information associated with a per-hop integrity key and/or the PN. The MIC may also protect a GCMP header associated with the MPDU.

The root AP may disable encryption corresponding to the MPDU between the root AP and a first bSTA associated with the first satellite AP.

The root AP may transmit the encrypted payload of the MPDU along with the MAC header and/or the MIC to the first bSTA.

The first bSTA may receive the encrypted payload of the MPDU along with the MAC header and/or the MIC from the root AP. The first bSTA may verify the MIC using information associated with the MAC header. The first bSTA may place the encrypted payload of the MPDU in a first buffer (e.g., a first receive (rx) buffer) associated with the first satellite AP, in response to a successful verification of the MIC.

The first bSTA may transmit a BA indicating one or more bits providing an acknowledgment feedback for the encrypted payload of the MPDU to the root AP. For example, the first bSTA may maintain a local BA scoreboard and sends the BA to the root AP to indicate which MPDUs (and their corresponding SNs) associated with the MPDU have not been received, so that the root AP can retransmit the indicated MPDUs to the first bSTA. The local BA scoreboard may indicate the MPDUs that have been received as well as not been received.

In certain aspects, the BA may be based on or is associated with a BA agreement between the root AP and the wireless STA. For example, the BA agreement is end-to-end (i.e., negotiated between the wireless STA and the root AP). In some cases, the SNs, the local BA scoreboard, and reorder (ReO) buffer at each satellite AP may be per wireless STA per traffic identifier (TID). In certain aspects, there may not be the ReO buffer at each satellite AP and only a BA scoreboard context is maintained for each end-to-end BA session (e.g., between the root AP and the wireless STA).

In certain aspects, the acknowledgment feedback indicates a positive acknowledgment when the MPDU is successfully received at the first bSTA. In some cases, the acknowledgment feedback further indicates the SN of the at least one MPDU.

In certain aspects, the acknowledgment feedback indicates a negative acknowledgment when the MPDU is not successfully received at the first bSTA. The acknowledgment feedback further indicates SN of the at least one MPDU.

In certain aspects, the first bSTA may output the MPDU that has been successfully received at the first satellite AP to the second satellite AP.

In certain aspects, for an end-to-end flow from the root AP to the wireless STA (e.g., which may be connected several hops away to a satellite AP), a link between different devices of the system 1000 may be congested (e.g., a status of the link may indicate a congested link due to high data traffic). In one example, when the wireless STA is connected several hops away from the root AP, a link between the root AP and the first satellite AP may not be congested. However, a link between the first satellite AP and the second (downstream) satellite AP (or between other subsequent satellite APs) may be congested due to the high data traffic between these APs. In another example, a link between a final satellite AP (e.g., which is a last satellite AP before the wireless STA) and the wireless STA may be congested due to the high data traffic between these devices. In such cases, a downstream AP may attempt to regulate (or throttle) the flow of MPDUs from the upstream AP by deliberately sending an indication of failed MPDUs (i.e., the MPDUs are not successfully received) even when some of these MPDUs may have been successfully received at the downstream AP. In other words, the downstream AP provides a negative acknowledgement for some of these MPDUs (which may be randomly selected by the downstream AP due to the congested link). In some cases, without such throttling, an intermediate AP (e.g., the first satellite AP, or the second satellite AP) may get overwhelmed (i.e., there may be an overflow of a buffer associated with the intermediate AP), since a rate of frames (which may carry MPDUs) arriving from the upstream AP may be higher than a rate at which the intermediate AP can drain the frames to another downstream AP (e.g., due to the congestion on a downstream link with the downstream AP). In some cases, when an upstream AP receives one or more indications of MPDU failures (from a downstream AP), then a rate adaptation algorithm at the upstream AP will naturally kick in and reduce an MPDU transmission rate associated with the upstream AP. In some cases, a number of failed MPDUs (e.g., indicated by the downstream AP) and a frequency of the one or more indications corresponding to the MPDU failures can be based on or due to a difference in the incoming MPDU transmission rate and the outgoing MPDU transmission rate at the downstream AP. In some cases, the downstream AP may send a control message to indicate to the upstream AP that the upstream AP should slow down its MPDU transmission rate. This may require defining of one or more new 802.11 control messages, which may be used by the downstream AP. Other sophisticated flow control schemes may also be applied to regulate the MPDU transmission rate at the upstream AP.

In certain aspects, the first bSTA may internally forward the encrypted payload of the MPDU (e.g., along with the SN and the PN) to a first bBSS (e.g., associated with the first satellite AP) for further transmission.

In certain aspects, the first bSTA may implement a BA request (BAR) policy to solicit an acknowledgment from a downstream wireless node (e.g., the second satellite AP) corresponding to a previously transmitted MPDU to the second satellite AP, and thereby advance a window for receiving the acknowledgment from the second satellite AP.

The first bBSS may create (or form) a new MAC header (e.g., four-address new MAC header with a new TA set to a basic service set identifier (BSSID) of the first satellite AP and a new RA set to a MAC address of a downstream bSTA (e.g., a second bSTA associated with the second satellite AP). The first bBSS may compute a new MIC associated with the new MAC header. For example, the first bBSS may compute the new MIC using a per-hop integrity key and/or the PN.

The first bBSS may add the new MAC header and/or the new MIC to the encrypted payload of the MPDU. The first bBSS may transmit the encrypted payload of the MPDU along with the new MAC header and/or the new MIC to the second bSTA.

The second bSTA may receive the encrypted payload of the MPDU along with the new MAC header and/or the new MIC from the first bBSS. The second bSTA may verify the new MIC using information associated with the new MAC header. The second bSTA may place the encrypted payload of the MPDU in a second buffer associated with the second satellite AP, in response to a successful verification of the new MIC.

The second bSTA may transmit a BA indicating one or more bits providing an acknowledgment feedback for the encrypted payload of the MPDU to the first bBSS. The BA may be based on or is associated with the BA agreement between the root AP and the wireless STA.

In one example, the acknowledgment feedback may indicate a positive acknowledgment when the MPDU is successfully received at the second bSTA. In another example, the acknowledgment feedback may indicate a negative acknowledgment when the MPDU is not successfully received at the second bSTA. The acknowledgment feedback further indicates the SN of the MPDU.

In certain aspects, the second bSTA may transmit the MPDU that has been successfully received at the second satellite AP to the wireless STA.

In certain aspects, the second bSTA may internally forward the encrypted payload of the MPDU (e.g., along with the SN and the PN) to a second bBSS (e.g., associated with the second satellite AP) for further transmission.

In certain aspects, the second bSTA may implement a BAR policy to solicit an acknowledgment from a downstream wireless node (e.g., the wireless STA) corresponding to a previously transmitted MPDU to the wireless STA, and thereby advance a window for receiving the acknowledgment from the wireless STA.

The second bBSS may create another new MAC header (e.g., (four-address) MAC header with another new TA set to a BSSID of the second satellite AP and another new RA set to a MAC address of a downstream wireless node (e.g., the wireless STA)). The second bBSS may compute another new MIC associated with the new MAC header created by the second bBSS. For example, the second bBSS may compute the new MIC using a per-hop integrity key and/or the PN.

The second bBSS may add the new MAC header and/or the new MIC (e.g., created by the second bBSS) to the encrypted payload of the MPDU. The second bBSS may transmit the encrypted payload of the MPDU along with the new MAC header and/or the new MIC to the wireless STA. The wireless STA receives the encrypted payload of the MPDU from the second bBSS. The wireless STA decrypts the encrypted payload of the MPDU.

In certain aspects, since the root AP encrypts the payload of the MPDU using a MLD-level PTK associated with the root AP and the wireless STA, content corresponding to the encrypted payload of the MPDU may be safe (i.e., end-to-end encryption (e2e)) and thereby can be sent over the air (OTA) without further per-hop (i.e., per satellite AP or other AP/STA) re-encryption. This allows the encrypted payload of the MPDU to be transmitted by each satellite AP towards the wireless STA.

In certain aspects, each satellite AP may use a new MAC header to relay the encrypted payload of the MPDU to another downstream satellite AP or the wireless STA. Each satellite AP may not further encrypt the encrypted payload of the MPDU, as the MAC header may need to carry original SN, PN, TID that were used by the root AP (e.g., when encrypting the payload of the MPDU).

In certain aspects, each satellite AP may not need to decrypt, re-encrypt, and re-order MPDUs, which may allow the MPDUs to be transmitted in a same transmit opportunity (TXOP) in which the MPDUs were received by the satellite AP.

In certain aspects, to avoid someone injecting undesirable frames for a satellite AP to relay to the wireless STA, a MIC is created and added to the encrypted payload of the MPDU to protect the MAC header associated with the MPDU.

In certain aspects, for a traffic flow that is between two wireless STAs which may not pass through the root AP, a MPDU may need to be forwarded to the root AP using a PTK associated with a source wireless STA and the root AP (followed by decryption of the MPDU at the root AP). Then, the decrypted MPDU may be re-encrypted by the root AP and transmitted to a target wireless STA (e.g., using a PTK associated with the root AP and the target STA). In this case, the decryption and re-encryption process is same as when an associated non-AP STA (or non-AP MLD) may want to transmit a frame to another non-AP STA (or MLD) within a same BSS. In this case, the AP may be the SMD AP MLD.

In certain aspects, each satellite AP may include or is associated with a proxy station (pSTA) for a groupcast operation or to serve wireless STA clients. For example, the pSTA may support a group address transmission (e.g., group address traffic for all client STAs that are associated with a satellite AP) and may also be used to serve legacy STAs that do not understand or know information associated with a SMD AP MLD. In some cases, there may be one pSTA for each of the group address transmission and each of the legacy STAs (i.e., one pSTA for group address traffic and one pSTA per legacy STA). In some cases, there may be one pSTA for all different applications (i.e., multi-application pSTA) and this may also apply to the STAs that do support (or understand) the concept of the SMD AP MLD. In some cases, the root AP and each pSTA may have a same relationship (e.g., association, establishing security, end-to-end BA session etc.) as described in the present disclosure with respect to the root AP and a wireless STA. In one scenario (e.g., when there are multiple pSTAs), each pSTA is associated with a different address, which may uniquely map to either the groupcast or a particular legacy STA. In another scenario (e.g., when there is only one pSTA), a root AP may generate a MPDU frame, and the MPDU frame may need a mechanism to identify an intended recipient (i.e., the groupcast or the particular legacy STA). This may be achieved by having an identifier embedded in the MPDU frame, which may match with an identifier for a group address frame corresponding to the groupcast operation or the particular legacy STA. In some cases, the MPDU frame may be sent via a multiple address format (e.g., six address format).

In certain aspects, a group temporal key (GTK) may be associated with the root AP, the pSTA, and the wireless STA. In such cases, the root AP may generate an encrypted payload of a MPDU based on the GTK, and then transmit the encrypted payload of the MPDU to the pSTA.

In certain aspects, a fronthaul of the satellite AP may groupcast a frame without the GTK for a BSS associated with the satellite AP. In certain aspects, there may be different GTKs for different fronthaul APs.

In certain aspects, the pSTA may be associated with a SMD MLD (e.g., on behalf of a wireless STA). The wireless STA may associate with a fronthaul AP and establish a PTK with the fronthaul AP.

In certain aspects, the pSTA may manage a BA session for transmitting one or more BAs. For example, the pSTA may maintain the BA session for all wireless STAs and any head of line (HOL) may block MPDUs for all the wireless STAs. In some cases, a HoL blocking occurs if there is a single queue of MPDUs waiting to be transmitted, and an MPDU at the head of the queue (line) cannot move forward due to congestion, even if other MPDUs behind this one could.

In certain aspects, the pSTA may be associated with one or more pSTA instances, and each of the one or more pSTA instances is associated with a wireless STA. Information associated with the one or more pSTA instances may assist the pSTA to determine which wireless STA a MPDU received by the pSTA has to be delivered.

In certain aspects, the pSTA may embed an association identification (AID) within the MPDU transmitted from the pSTA. The MPDU may correspond to or is associated with a six-address frame.

Figure 11:
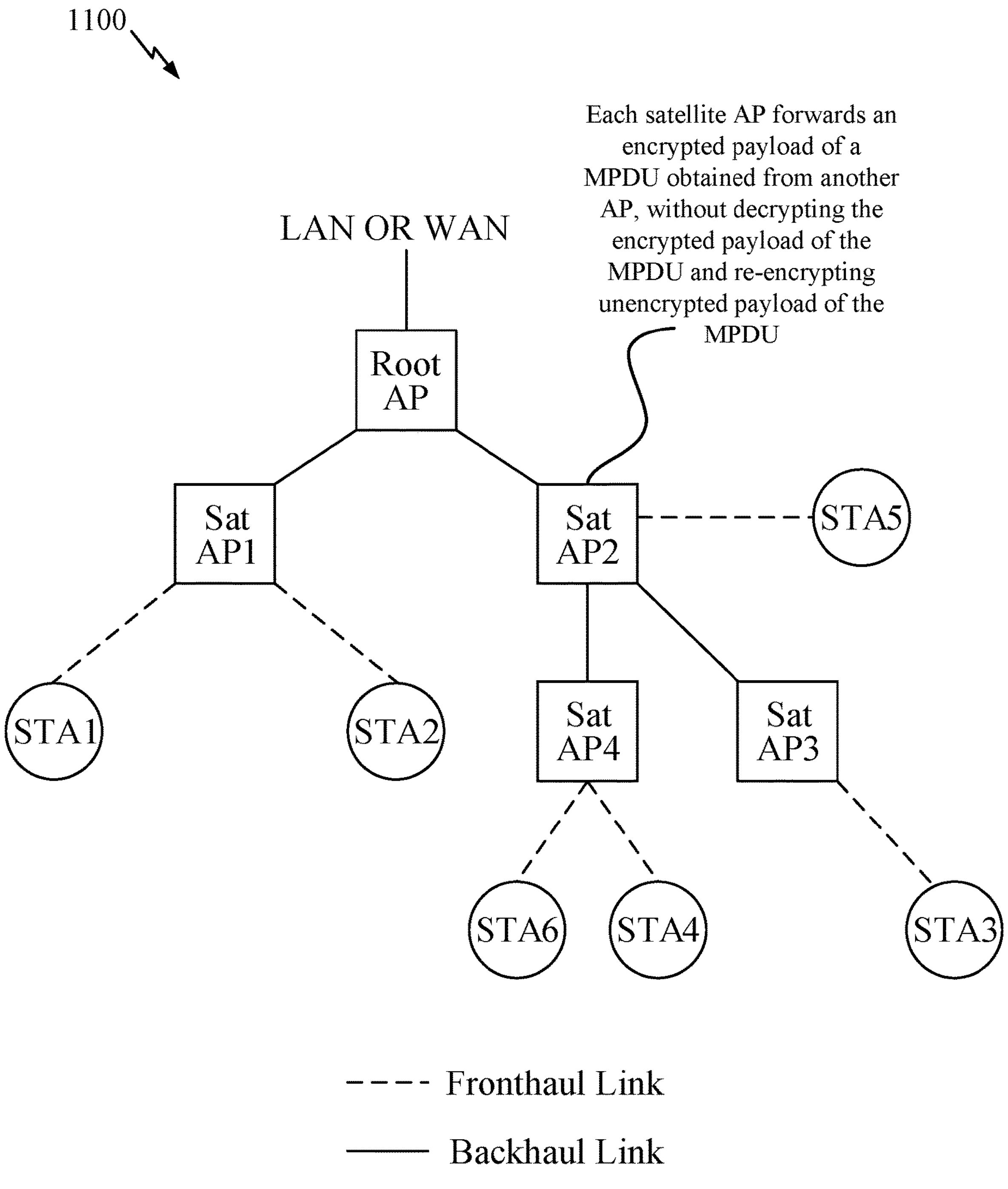
FIG. 11 shows a pictorial diagram of another example easy mesh system including wireless nodes.

FIG. 11 shows a pictorial diagram of another example easy mesh system 1100. The easy mesh system 1100 includes wireless nodes. For example, the easy mesh system 1100 includes a root AP that has access to a LAN and/or WAN.

The easy mesh system 1100 also includes satellite APs. The satellite APs may include at least a first satellite AP (Sat AP1), a second satellite AP (Sat AP2), a third satellite AP (Sat AP3), and a fourth satellite AP (Sat AP4). Each satellite AP may be configured to forward an encrypted payload of a MPDU received from another AP, without decrypting the encrypted payload of the MPDU and re-encrypting unencrypted payload of the MPDU. Each satellite AP may include or is associated with a pSTA.

The first satellite AP is associated with a first wireless STA (STA1) and a second wireless STA (STA2). The second satellite AP is associated with a fifth wireless STA (STA5). The third satellite AP is associated with a third wireless STA (STA3). The fourth satellite AP is associated with a fourth wireless STA (STA4) and a sixth wireless STA (STA6).

In some cases, there may a HoL blocking if there is a single fat pipe between the root AP and a pSTA associated with one of the satellite APs. For example, in the easy mesh system 1100, there can be HoL blocking at the second satellite AP for all downstream satellite APs and wireless STAs. To address the HoL blocking, in some cases, the second satellite AP may maintain separate BA sessions with the fifth wireless STA, the third satellite AP, and the fourth satellite AP.

Figure 12:
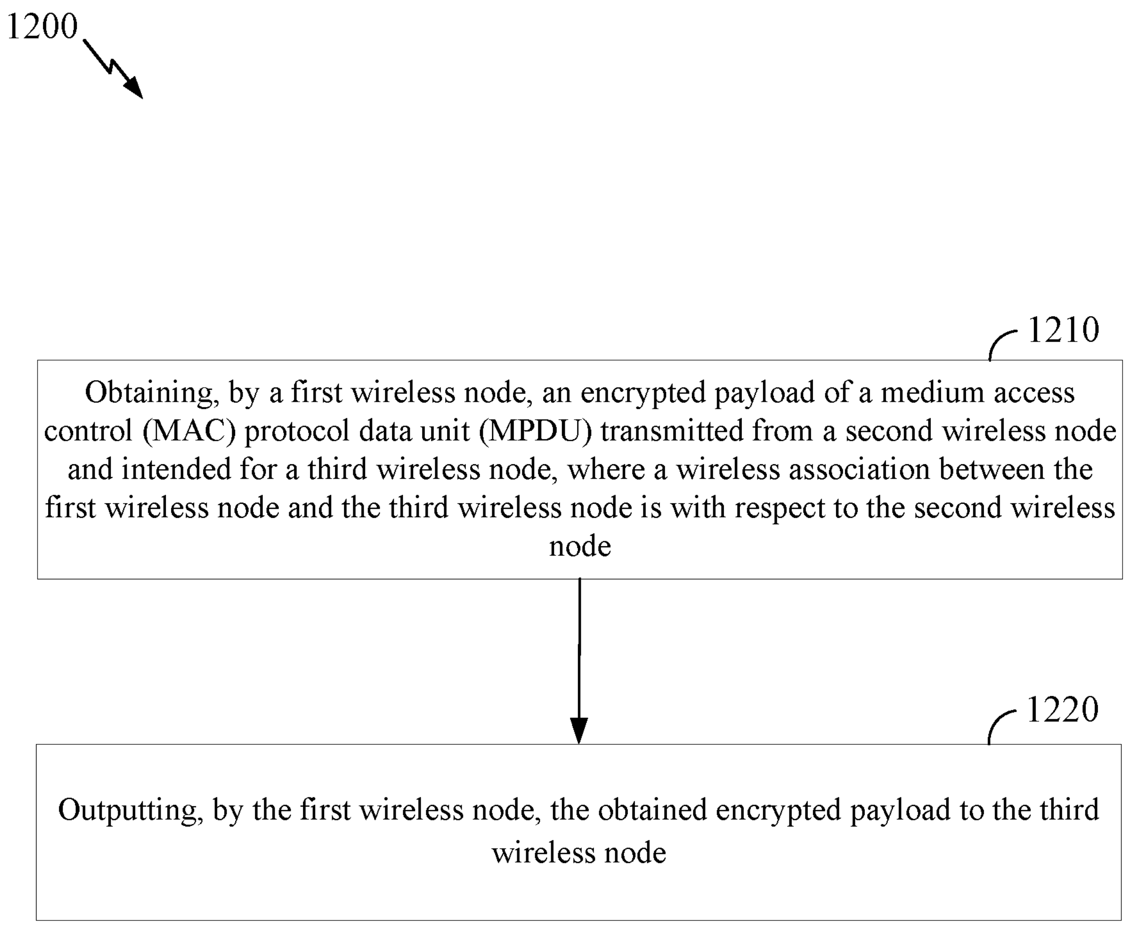
FIG. 12 shows a flowchart illustrating an example process performable by a first wireless node configured as a satellite AP.

FIG. 12 shows a flowchart illustrating a process 1200 performable at a first wireless node, according to some aspects of the present disclosure. The operations of the process 1200 may be implemented by the first wireless node or its components as described herein. For example, the process 1200 may be performed by a wireless communication device, such as a wireless communication device 1500 described with reference to FIG. 15, operating as or within the first wireless node. In some examples, the process 1200 may be performed by the first wireless node, such as one of the wireless APs 102 described with reference to FIG. 1. The operations of the process 1200 and subject matter of the present disclosure may be applicable for different systems. For example, the operations of the process 1200 and the subject matter of the present disclosure may apply to 802.11s mesh system (as defined in Institute of Electrical and Electronics Engineers (IEEE) 802.11), an easy mesh system (as defined in WiFi Alliance), and/or other mesh-based network systems.

At 1210, the process 1200 includes the first wireless node obtaining an encrypted payload of a MPDU transmitted from a second wireless node and intended for a third wireless node. A wireless association between the first wireless node and the third wireless node may be with respect to the second wireless node.

At 1220, the process 1200 includes the first wireless node outputting the obtained encrypted payload to the third wireless node. For example, the outputting may indicate that the first wireless node may forward (or deliver) the encrypted payload to the third wireless node, without decrypting the encrypted payload and re-encrypting unencrypted payload at the first wireless node.

In certain aspects, the first wireless node may be a first satellite AP positioned between (e.g., for a transmission path between) the second wireless node and the third wireless node. The second wireless node may be a root AP, or a second satellite AP positioned between (e.g., for the transmission path between) the root AP and the first satellite AP. The third wireless node may be a wireless STA (e.g., a final client wireless node or STA), or a third satellite AP positioned between (e.g., for the transmission path between) the wireless STA and the first satellite AP.

In certain aspects, the first wireless node may be a mesh wireless STA positioned between (e.g., for the transmission path between) the second wireless node and the third wireless node. The second wireless node may be a mesh gateway. The third wireless node may be a client wireless STA.

In certain aspects, the obtaining further includes obtaining a MAC header associated with the MPDU and/or a MIC associated with the MPDU.

In certain aspects, the MAC header is further associated with: a TA corresponding to an immediate sender of the MPDU, a RA corresponding to an immediate receiver of the MPDU, a SA corresponding to an original source of the MPDU, a DA corresponding to a final recipient of the MPDU, a SN associated with of the MPDU, and/or a PN associated with the MPDU. In one example, the RA may indicate the third satellite AP and the DA may indicate the wireless STA (e.g., when the third satellite AP is positioned between the wireless STA and the first satellite AP). In another example, the RA may indicate the wireless STA (e.g., when the third wireless node is the wireless STA).

In certain aspects, the MIC is further associated with at least one of the MAC header or a per-hop integrity key.

In certain aspects, the process 1200 further includes the first wireless node verifying the MIC based on or using information associated with the MAC header and placing the encrypted payload in a buffer associated with the first wireless node in response to a successful verification of the MIC.

In certain aspects, the MIC is further associated with at least one of a new key or a new PN. The new PN is associated with the MPDU. The new key is different from a key configured for regular data encryption. The new PN is different from a PN configured for the regular data encryption. For example, the first wireless node may be associated with two sets of keys and PNs. The first wireless node may use a first set of key and PN for the regular data encryption (i.e., encrypting data between the first wireless node and a downstream bSTA). The first wireless node may use a second set of key and PN (i.e., the new key and the new PN) for the MIC. So, the MIC is only associated with the second set of key and PN, and not the first set of key and PN.

In certain aspects, the new PN associated with the MPDU is incremented each time at least one of: a new MAC header is created or a new MIC is created. The process 1200 further includes the first wireless node verifying the MIC based on or using information associated with the new PN and accepting the encrypted payload, in response to a successful verification of the MIC. For example, the new PN associated with the MPDU may be incremented by one for each new MAC header and/or the new MIC. In this case, the first wireless node may accept the MIC and/or the MAC header, when the new PN associated with the MIC and/or the MAC header is greater than that of a PN associated with a previously received MIC (e.g., good or valid MIC).

Figure 13:
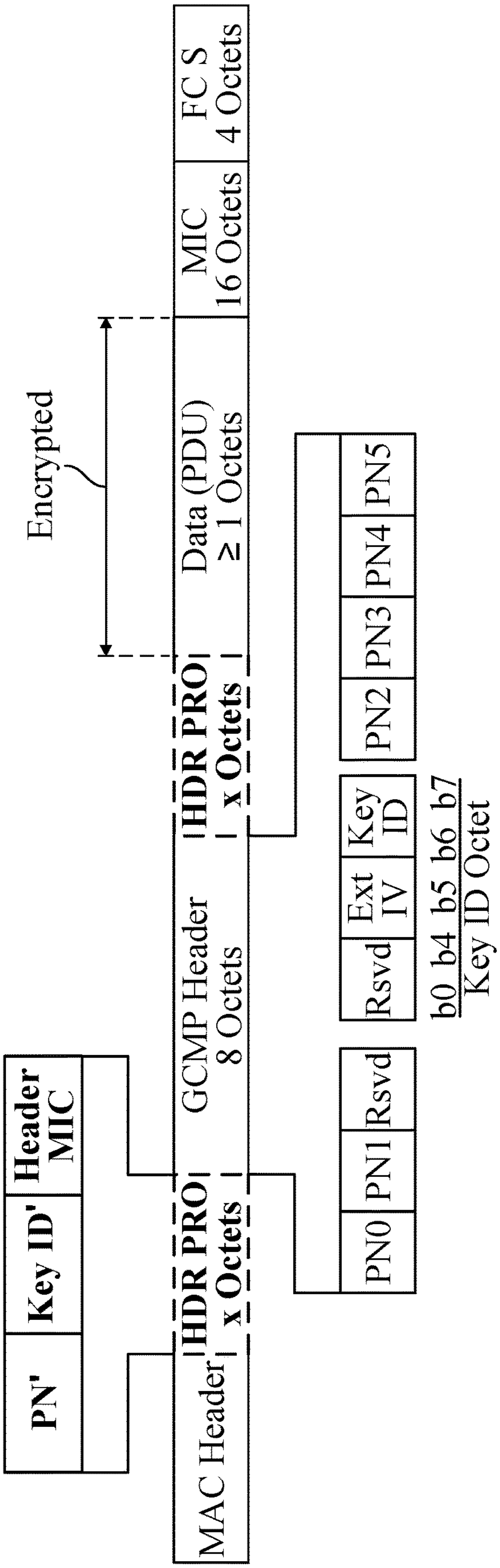
FIG. 13 shows example headers associated with a medium access control (MAC) PDU (MPDU).

In certain aspects, the MIC may be placed before a GCMP header associated with the MPDU. In certain aspects, the MIC may be placed after the GCMP header associated with the MPDU. As shown in FIG. 13, the MIC is associated with multiple fields, such as, at least a PN field and a key ID field. The PN field carries the PN associated with the MIC and the key ID field identifies the key associated with the MIC.

Referring back to FIG. 12, the process 1200 further includes the optional step (not shown in FIG. 12) of the first wireless node outputting (e.g., forwarding, delivering, etc.) a BA indicating one or more bits providing an acknowledgment feedback for the encrypted payload to the second wireless node. The BA may be based on or associated with a BA agreement between the second wireless node and the third wireless node.

In certain aspects, the acknowledgment feedback indicates a positive acknowledgment when the MPDU is successfully obtained at the first wireless node.

In certain aspects, the acknowledgment feedback indicates a negative acknowledgment when the MPDU is not successfully received at the first wireless node. The acknowledgment feedback further indicates an ID of the MPDU.

In certain aspects, the process 1200 further includes (e.g., in said step 1220) the first wireless node outputting (e.g., forwarding, delivering, etc.) to the third wireless node, the MPDU that has been successfully received at the first wireless node.

In certain aspects, the first wireless node includes or is associated with a bSTA, and the bSTA associates the first wireless node with the second wireless node.

In certain aspects, the first wireless node includes or is associated with a bBSS, and the bBSS associates the first wireless node with the third wireless node.

In certain aspects, the bSTA forwards the encrypted payload to the bBSS (e.g., for further transmission to the third wireless node).

In certain aspects, the process 1200 further includes the first wireless node creating a new MAC header for the MPDU. The new MAC header is associated with a new TA corresponding to an immediate sender of the MPDU and/or a new RA corresponding to an immediate receiver of the MPDU. The new MAC header is further associated with a SA corresponding to an original source of the MPDU, a DA corresponding to a final recipient of the MPDU, a SN associated with of the MPDU, and/or a PN associated with the MPDU. The process 1200 further includes the first wireless node computing a new MIC associated with the MPDU based on or using information associated with the new MAC header. The process 1200 further includes the first wireless node outputting the encrypted payload with at least one of: the new MIC or the new MAC header to the third wireless node.

In certain aspects, the second wireless node is configured as a SMD AP MLD that has access to a LAN and/or WAN.

In certain aspects, the first wireless node includes or is associated with a pSTA. The pSTA is associated with the SMD AP MLD. The pSTA manages a BA session for outputting one or more BAs. The pSTA is associated with one or more pSTA instances. Each of the one or more pSTA instances is associated with a wireless STA. The pSTA embeds an AID within the MPDU outputted from the pSTA.

In certain aspects, the first wireless node obtains a first set of MPDUs (including the MPDU) from the second wireless node at one or more rates associated with a first average rate. The first average rate may be an average value of multiple rates (e.g., a first rate, a second rate). The first wireless node evaluates the status of the first link between first wireless node and the second wireless node, and the second link between the first wireless node and the third wireless node. The status for each link may indicate a congested link (e.g., due to high amount of data traffic between the first wireless node and the third wireless node, slow movement of the data traffic from the first wireless node to the third wireless node) or poor channel conditions on the link (due to interference). If the first wireless node determines (based on or per the evaluation) that the status of the first link is better than that on the second link (and therefore, it is receiving MPDUs, on the in-bound (first) link from second wireless node, at a faster average rate than the rate at which it can deliver on the outbound (second) link to the third wireless node), then the first wireless node transmits (e.g., to the second wireless node) a negative acknowledgment indicating one or more MPDUs have not been successfully obtained at the first wireless node (even if the selected MPDUs packets have been successfully obtained at the first wireless node). The MPDUs for which negative acknowledgement is indicated can be selected randomly or based on certain algorithm. In response to the negative acknowledgment, the first wireless node may obtain one or more subsequent MPDUs from the second wireless node at a second average rate (which may be different from or same as the first average rate). The second average rate may be an average value of multiple rates (e.g., a third rate, a fourth rate). In one example, the second average rate may have a lower value than the first average rate. In some cases, the first wireless node may transmit (e.g., to the third wireless node) a second set of MPDUs at the second average rate. In such cases, the status of the link between the first wireless node and the third wireless node may be based on or associated with one or more average rates (e.g., at least the second average rate).

In certain aspects, two or more wireless nodes (e.g., APs, STAs) may be associated with each other via one or more links (e.g., a wired link, a wireless link, or a hybrid link system with both wired and wireless links). In one example, a root AP and a satellite AP may be associated with each other via the wired link. In another example, the root AP and the satellite AP may be associated with each other via the wireless link. In another example, a first satellite AP and a second satellite AP may be associated with each other via the wired link. In another example, the first satellite AP and the second satellite AP may be associated with each other via the wireless link. In another example, an AP and a STA may be associated with each other via the wired link or the wireless link.

In some cases, when the wireless nodes are associated with each other via the wired link, a payload of the MPDU may be encrypted during an encryption process, and may also contain a GCMP header, encrypted data, and a MIC. In some cases, a new parameter (e.g., EtherType) may be used or defined, which may enable a receiver satellite AP to determine and identify the encrypted payload.

Figure 14:
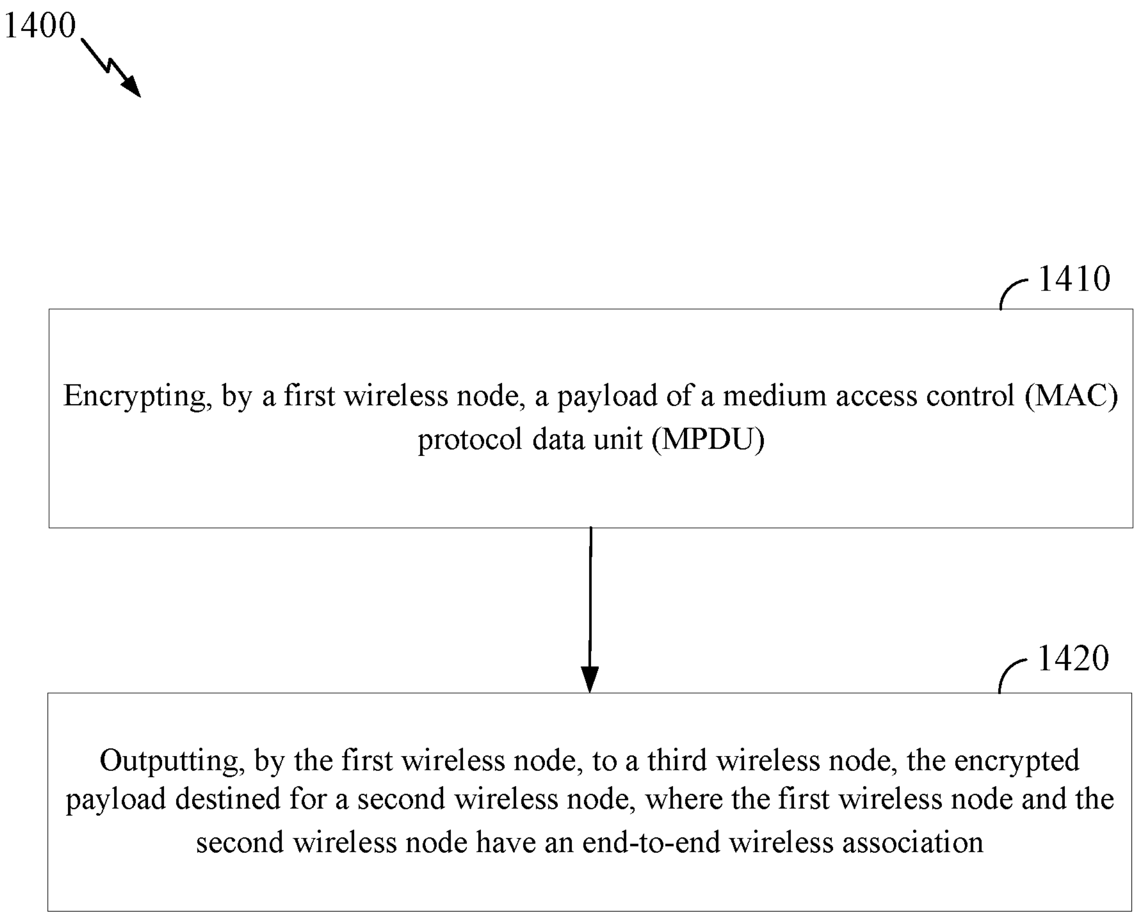
FIG. 14 shows a flowchart illustrating an example process performable by a first wireless node configured as a root AP.

FIG. 14 shows a flowchart illustrating a process 1400 performable at a first wireless node, according to some aspects of the present disclosure. The operations of the process 1400 may be implemented by the first wireless node or its components as described herein. For example, the process 1400 may be performed by a wireless communication device, such as a wireless communication device 1500 described with reference to FIG. 15, operating as or within the first wireless node. In some examples, the process 1400 may be performed by the first wireless node, such as one of the wireless APs 102 described with reference to FIG. 1. The operations of the process 1400 and subject matter of the present disclosure may be applicable for different systems. For example, the operations of the process 1400 and the subject matter of the present disclosure may apply to the 802.11s mesh system, the easy mesh system, and other mesh-based network systems.

At 1410, the process 1400 includes the first wireless node encrypting a payload of a MPDU.

At 1420, the process 1400 includes the first wireless node outputting (e.g., for transmission) to a third wireless node, the encrypted payload destined for a second wireless node. The first wireless node and the second wireless node have an end-to-end wireless association. In certain aspects, the third wireless node forwards the encrypted payload obtained from the first wireless node without decrypting the encrypted payload and re-encrypting unencrypted payload.

In certain aspects, the first wireless node may be a root AP. The second wireless node may be a wireless STA. The third wireless node may be a satellite AP positioned between the first wireless node and the second wireless node.

In certain aspects, the first wireless node may be a mesh gateway. The second wireless node may be a client wireless STA. The third wireless node may be a mesh wireless STA positioned between the first wireless node and the second wireless node.

In certain aspects, the process 1400 further includes the first wireless node configuring the first wireless node as a SMD AP MLD that has access to a LAN and/or WAN.

In certain aspects, the second wireless node is configured as a non-AP MLD, and the non-AP MLD is associated with the SMD AP MLD.

In certain aspects, the payload of the MPDU is encrypted based on or using information associated with a PTK associated with the SMD AP MLD and the non-AP MLD.

In certain aspects, the third wireless node is configured as a satellite AP associated with the SMD AP MLD.

In certain aspects, the process 1400 further includes the first wireless node creating a MAC header associated with the MPDU. The MAC header is further associated with: a TA corresponding to an immediate sender of the MPDU, a RA corresponding to an immediate receiver of the MPDU, a SA corresponding to an original source of the MPDU, a DA corresponding to a final recipient of the MPDU, a SN associated with the MPDU, and/or a PN associated with the MPDU.

In certain aspects, the process 1400 further includes the first wireless node computing a MIC associated with the MPDU. The MIC is further associated with at least one the MAC header or a per-hop integrity key.

In certain aspects, the third wireless node includes or is associated with a bSTA, and the bSTA associates the third wireless node with the first wireless node.

In certain aspects, the process 1400 includes the first wireless node outputting, for transmission, the MIC and/or the MAC header to the bSTA (e.g., along with the encrypted payload).

In certain aspects, the third wireless node includes or is associated with a pSTA for a groupcast operation, and a GTK is associated with the first wireless node, the pSTA, and the second wireless node.

In certain aspects, the outputting further includes outputting the encrypted payload to the pSTA, and the encrypted payload is associated with the GTK.

Figure 15:
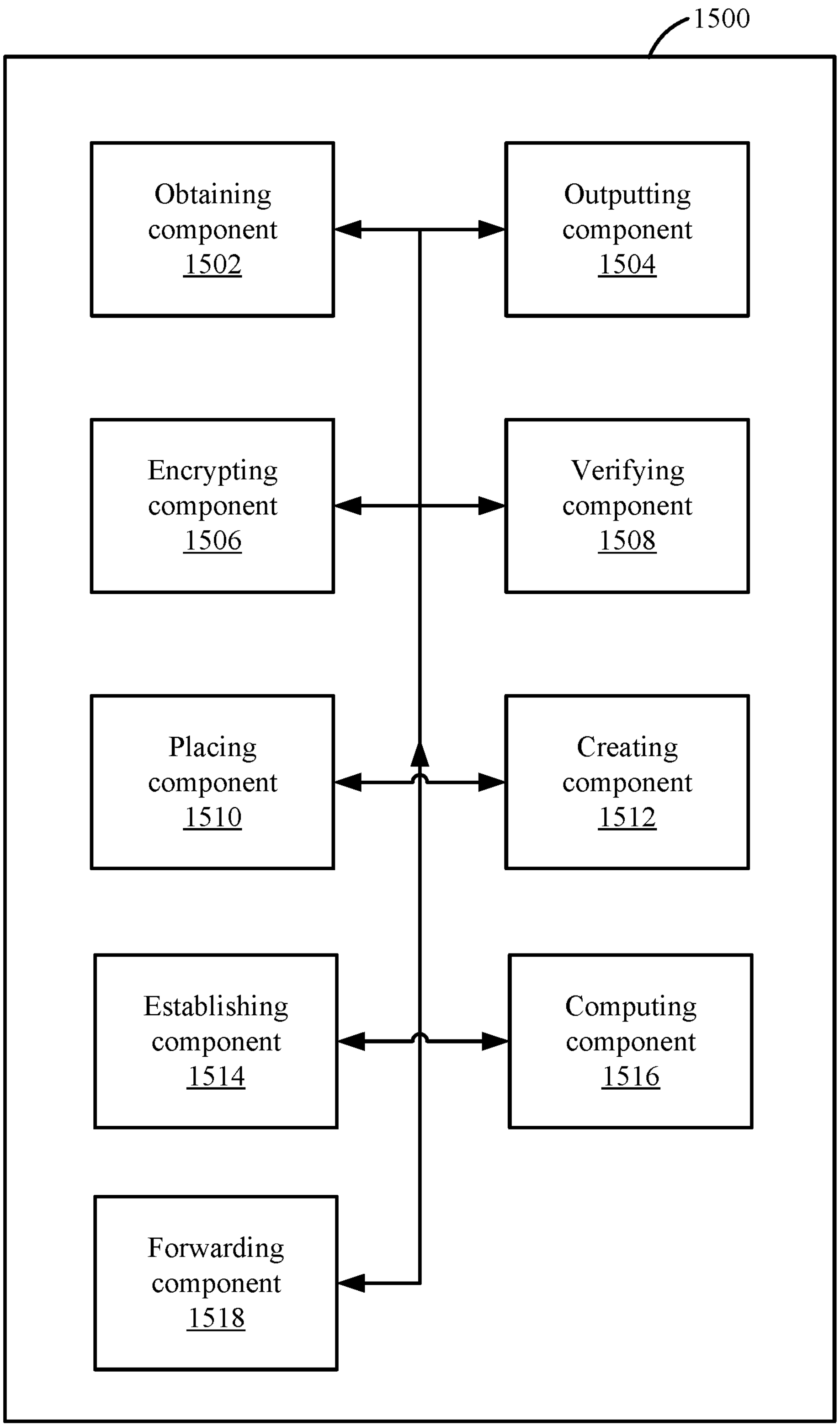
FIG. 15 shows a block diagram of an example wireless communication device configured as a wireless AP.

FIG. 15 shows a block diagram of a wireless communication device 1500 (such as a satellite AP and/or a root AP), according to some aspects of the present disclosure. In one example, the wireless communication device 1500 is configured or operable to perform a process 1200 described with reference to FIG. 12. In another example, the wireless communication device 1500 is configured or operable to perform a process 1400 described with reference to FIG. 14. In various examples, the wireless communication device 1500 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 1500 can be a device for use in an AP, such as AP 102 described with reference to FIG. 1. In some other examples, the wireless communication device 1500 can be an AP that includes a chip, SoC, chipset, package or device as well as multiple antennas. The wireless communication device 1500 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1500 also includes or can be coupled with an application processor which may be further coupled with another memory. In some examples, the wireless communication device 1500 further includes at least one external network interface that enables communication with a core network or backhaul network to gain access to external networks including the Internet.

The wireless communication device 1500 includes obtaining component 1502, outputting component 1504, encrypting component 1506, verifying component 1508, placing component 1510, creating component 1512, establishing component 1514, computing component 1516, and/or forwarding component 1518. Portions of one or more of the components 1502, 1504, 1506, 1508, 1510, 1512, 1514, 1516, and 1518 may be implemented at least in part in hardware or firmware. For example, the obtaining component 1502 and the outputting component 1504 may be implemented at least in part by a modem. In some examples, at least some of the components 1502, 1504, 1506, 1508, 1510, 1512, 1514, 1516 and/or 1518 are implemented at least in part by a processor and as software stored in a memory. For example, portions of one or more of the components 1502, 1504, 1506, 1508, 1510, 1512, 1514, 1516 or 1518 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the wireless communication device 1500). For example, a processing system of the wireless communication device 1500 may refer to a system including the various other components or subcomponents of the wireless communication device 1500, such as the processor, or a transceiver, or a communications manager, or other components or combinations of components of the wireless communication device 1500. The processing system of the wireless communication device 1500 may interface with other components of the wireless communication device 1500, and may process information received from other components (such as inputs or signals) or output information to other components. For example, a chip or modem of the wireless communication device 1500 may include a processing system, a first interface to output information and a second interface to obtain information. In some implementations, the first interface may refer to an interface between the processing system of the chip or modem and a transmitter, such that the wireless communication device 1500 may transmit information output from the chip or modem. In some implementations, the second interface may refer to an interface between the processing system of the chip or modem and a receiver, such that the wireless communication device 1500 may obtain information or signal inputs, and the information may be passed to the processing system. A person having ordinary skill in the art will readily recognize that the first interface also may obtain information or signal inputs, and the second interface also may output information or signal outputs.

The obtaining component 1502 may be capable of, configured to, or operable to at least obtain an encrypted payload of a MPDU transmitted from a second wireless node and intended for a third wireless node.

The outputting component 1504 may be capable of, configured to, or operable to at least output (e.g., for transmission, forward) the encrypted payload to the third wireless node.

The encrypting component 1506 may be capable of, configured to, or operable to at least encrypt a payload of a MPDU (e.g., when the wireless communication device 1500 may act as the root AP). In some cases, when the communication device 1500 may act as a satellite AP between the root AP and an STA, the encrypting component 1506 may not be employed.

The verifying component 1508 may be capable of, configured to, or operable to at least verify a MIC based on or using information associated with a MAC header. In some cases, the verifying component 1508 may also capable of, configured to, or operable to at least accept the encrypted in response to a successful verification of a MIC.

The placing component 1510 may be capable of, configured to, or operable to at least place an encrypted payload of a MPDU in a buffer associated with a first wireless node, in response to a successful verification of a MIC. In some cases, the placing component 1510 (or one of its subcomponent) may also be capable of, configured to, or operable to at least accept the encrypted payload in response to a successful verification of a MIC.

The creating component 1512 may be capable of, configured to, or operable to at least create a new MAC header for a MPDU.

The establishing component 1514 may be capable of, configured to, or operable to at least establish a first BA session with the second wireless node for an end-to-end communication flow from the first wireless node to the client wireless node.

The computing component 1516 may be capable of, configured to, or operable to at least compute a new MIC associated with the MPDU using information associated with the new MAC header.

The forwarding component 1518 may be capable of, configured to, or operable to at least forward the encrypted payload to another wireless node.

Various components of the wireless communication device 1500 may provide means for performing the process 1200 described with reference to FIG. 12, the process 1400 described with reference to FIG. 14, or any aspect related to it. Means for receiving or obtaining may include transceivers and/or antenna(s) of the AP 102 described with reference to FIG. 1 and/or the obtaining component 1502 of the wireless communication device 1500. Means for transmitting, sending or outputting (e.g., for transmission, forwarding) may include transceivers and/or antenna(s) of the AP 102 described with reference to FIG. 1 and/or the outputting component 1504 of the wireless communication device 1500. Means for encrypting may include one or more processors (such as a receive processor, a controller, and/or a transmit processor) of the AP 102 described with reference to FIG. 1 and/or the encrypting component 1506 of the wireless communication device 1500. Means for verifying may include one or more processors (such as a receive processor, a controller, and/or a transmit processor) of the AP 102 described with reference to FIG. 1 and/or the verifying component 1508 of the wireless communication device 1500. Means for placing may include one or more processors (such as a receive processor, a controller, and/or a transmit processor) of the AP 102 described with reference to FIG. 1 and/or the placing component 1510 of the wireless communication device 1500. Means for creating may include one or more processors (such as a receive processor, a controller, and/or a transmit processor) of the AP 102 described with reference to FIG. 1 and/or the creating component 1512 of the wireless communication device 1500. Means for establishing may include one or more processors (such as a receive processor, a controller, and/or a transmit processor) of the AP 102 described with reference to FIG. 1 and/or the establishing component 1514 of the wireless communication device 1500. Means for computing may include one or more processors (such as a receive processor, a controller, and/or a transmit processor) of the AP 102 described with reference to FIG. 1 and/or the computing component 1516 of the wireless communication device 1500. Means for forwarding may include one or more processors (such as a receive processor, a controller, and/or a transmit processor) of the AP 102 described with reference to FIG. 1 and/or the forwarding component 1518 of the wireless communication device 1500.

In some cases, rather than actually transmitting, for example, signals and/or data, the wireless communication device 1500 may have an interface to output signals and/or data for transmission (means for outputting). For example, a processor may output signals and/or data, via a bus interface, to a radio frequency (RF) front end of the wireless communication device 1500 for transmission. In various aspects, the RF front end may include various components, including transmit and receive processors, transmit and receive MIMO processors, modulators, demodulators, and the like.

In some cases, rather than actually receiving signals and/or data, the wireless communication device 1500 may have an interface to obtain the signals and/or data received from another device (means for obtaining). For example, a processor may obtain (or receive) the signals and/or data, via a bus interface, from an RF front end of the wireless communication device 1500 for reception. In various aspects, the RF front end may include various components, including transmit and receive processors, transmit and receive MIMO processors, modulators, demodulators, and the like.

EXAMPLE CLAUSES

Implementation examples are described in the following numbered clauses:

Clause 1: A method for wireless communication at a first wireless node, comprising: obtaining an encrypted payload of a medium access control (MAC) protocol data unit (MPDU) transmitted from a second wireless node and intended for a third wireless node, wherein a wireless association between the first wireless node and the third wireless node is with respect to the second wireless node; and forwarding the obtained encrypted payload to the third wireless node.

Clause 2: The method of clause 1, further comprising obtaining a MAC header associated with the MPDU or a message integrity code (MIC) associated with the MPDU.

Clause 3: The method of clause 2, wherein: the MAC header is further associated with at least one of a transmitter address (TA) corresponding to an immediate sender of the MPDU, a receiver address (RA) corresponding to an immediate receiver of the MPDU, a source address (SA) corresponding to an original source of the MPDU, a destination address (DA) corresponding to a final recipient of the MPDU, a sequence number (SN) associated with the MPDU, or a packet number (PN) associated with the MPDU; and the MIC is further associated with at least one of the MAC header or a per-hop integrity key.

Clause 4: The method of clause 3, wherein the RA indicates the third wireless node and the DA indicates a client wireless node, and wherein the third wireless node is different from the client wireless node.

Clause 5: The method of clause 3, wherein the RA indicates the third wireless node, and wherein the third wireless node corresponds to a client wireless node.

Clause 6: The method of clause 2, further comprising verifying the MIC using information associated with the MAC header; and placing, after verifying the MIC, the encrypted payload in a buffer associated with the first wireless node.

Clause 7: The method of clause 2, wherein, at least one of: the MIC is further associated with at least one of: a new key or a new packet number (PN), the new PN is associated with the MPDU, the new key is different from a key configured for regular data encryption, the new PN is different from a PN configured for the regular data encryption, or the new PN associated with the MPDU is incremented each time at least one of: a new MAC header is created or a new MIC is created.

Clause 8: The method of clause 7, further comprising verifying the MIC using information associated with the new PN, and accepting, after verifying the MIC, the encrypted payload.

Clause 9: The method of any one of clauses 1-8, further comprising outputting a block acknowledgement (BA) indicating one or more bits providing an acknowledgment feedback for the encrypted payload to the second wireless node, wherein the BA is associated with a BA agreement between the second wireless node and the third wireless node.

Clause 10: The method of clause 9, wherein the acknowledgment feedback indicates a positive acknowledgment when the MPDU is successfully obtained at the first wireless node.

Clause 11: The method of clause 9, wherein the acknowledgment feedback indicates a negative acknowledgment when the MPDU is not successfully obtained at the apparatus, and wherein the acknowledgment feedback further indicates an identification (ID) of the MPDU. For example, the ID may be the same as an SN assigned to that MPDU.

Clause 12: The method of any one of clauses 1-11, further comprising creating a new MAC header for the MPDU, wherein the new MAC header is associated with at least one of: a new transmitter address (TA) corresponding to an immediate sender of the MPDU, a new receiver address (RA) corresponding to an immediate receiver of the MPDU, a source address (SA) corresponding to an original source of the MPDU, a destination address (DA) corresponding to a final recipient of the MPDU, or a sequence number (SN) associated with the MPDU, or a packet number (PN) associated with the MPDU; computing a new message integrity code (MIC) associated with the MPDU using information associated with the new MAC header; and outputting at least one of: the new MIC or the new MAC header to the third wireless node.

Clause 13: The method of clause 1, wherein: the first wireless node is associated with a backhaul STA (bSTA), and the bSTA associates the first wireless node with the second wireless node.

Clause 14: The method of clause 13, wherein: the first wireless node is associated with a backhaul basic service set (bBSS), the bBSS associates the first wireless node with the third wireless node, and the bSTA forwards the encrypted payload to the bBSS.

Clause 15: The method of clause 1, wherein the first wireless node is associated with a proxy station (pSTA) and at least one of: the pSTA is associated with a single mobility domain (SMD) access point (AP) multi-link device (MLD), the pSTA manages a block acknowledgement (BA) session for outputting one or more BAs, the pSTA is associated with one or more pSTA instances, each of the one or more pSTA instances is associated with a wireless station (STA), or the pSTA embeds an association identification (AID) within the MPDU transmitted from the pSTA.

Clause 16: The method of any one of clauses 1-15, wherein at least one of: the first wireless node is positioned between the second wireless node and a client wireless node; the third wireless node is positioned between the second wireless node and the client wireless node; establishing a first block acknowledgement (BA) session with the third wireless node for an end-to-end communication flow from the second wireless node to the client wireless node; or the first BA session is different from a second BA session between the second wireless node and the client wireless node.

Clause 17: The method of any one of clauses 1-16, further comprising at least one of: randomly obtaining one or more MPDUs, in accordance with a status of a link between the first wireless node and the third wireless node; or outputting a negative acknowledgment indicating that the one or more MPDUs are not successfully obtained at the first wireless node.

Clause 18: The method of clause 17, further comprising obtaining a first set of MPDUs at one or more rates associated with a first average rate; and obtaining, after obtaining the first set, a second set of MPDUs at one or more rates associated with a second average rate, wherein at least one of: the first average rate is different from the second average rate; the first average rate and the second average rate are the same; or the first set includes the MPDU.

Clause 19: The method of clause 17, further comprising obtaining a first set of MPDUs at one or more rates associated with a first average rate; and outputting a second set of MPDUs at one or more rates associated with a second average rate, wherein at least one of: the status of the link is associated with the second average rate; the second average rate is lower than the first average rate; or the first set includes the MPDU.

Clause 20: A method for wireless communication at a first wireless node, comprising: encrypting a payload of a medium access control (MAC) protocol data unit (MPDU); and outputting to a third wireless node, the encrypted payload destined for a second wireless node, wherein the first wireless node and the second wireless node have an end-to-end wireless association.

Clause 21: The method of clause 20, wherein the payload of the MPDU is encrypted using a pairwise transient key (PTK) associated with the first wireless node and the second wireless node.

Clause 22: The method of clause 20, further comprising creating a MAC header associated with the MPDU, wherein the MAC header is further associated with at least one of: a transmitter address (TA) corresponding to an immediate sender of the MPDU, a receiver address (RA) corresponding to an immediate receiver of the MPDU, a source address (SA) corresponding to an original source of the MPDU, a destination address (DA) corresponding to a final recipient of the MPDU, a sequence number (SN) associated with the MPDU, or a packet number (PN) associated with the MPDU.

Clause 23: The method of clause 20, further comprising computing a message integrity code (MIC) associated with the MPDU, wherein the MIC is further associated with at least one of: the MAC header or a per-hop integrity key.

Clause 24: The method of clause 23, further comprising outputting at least one of: the MIC or the MAC header.

Clause 25: An apparatus, comprising: a memory comprising executable instructions; and one or more processors, individually or collectively, configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by one or more processors of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Clause 29: An access point (AP), comprising: at least one transceiver; a memory comprising executable instructions; and one or more processors, individually or collectively, configured to execute the executable instructions and cause the AP to perform a method in accordance with any one of Clauses 1-19, wherein the at least one transceiver is configured to: receive the encrypted payload and transmit the encrypted payload.

Clause 30: An access point (AP), comprising: at least one transceiver; a memory comprising executable instructions; and one or more processors, individually or collectively, configured to execute the executable instructions and cause the AP to perform a method in accordance with any one of Clauses 20-24, wherein the at least one transceiver is configured to: transmit the encrypted payload.

Additional Considerations

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The invention claimed is:

1. An apparatus for wireless communication, comprising:
- at least one transceiver;
- at least one memory comprising instructions; and
- one or more processors, individually or collectively, configured to execute the instructions to cause the apparatus to:
  - receive, via the at least one transceiver, an encrypted payload of a medium access control (MAC) protocol data unit (MPDU) transmitted from a first wireless node and intended for a second wireless node, wherein a wireless association between the apparatus and the second wireless node is with respect to the first wireless node; and
  - forward, via the at least one transceiver, the received encrypted payload to the second wireless node.

2. The apparatus of claim 1, wherein the one or more processors, individually or collectively, are configured to execute the instructions to cause the apparatus to receive, via the at least one transceiver, at least one of: a MAC header associated with the MPDU or a message integrity code (MIC) associated with the MPDU.

3. The apparatus of claim 2, wherein:
- the MAC header is further associated with at least one of: a transmitter address (TA) corresponding to an immediate sender of the MPDU, a receiver address (RA) corresponding to an immediate receiver of the MPDU, a source address (SA) corresponding to an original source of the MPDU, a destination address (DA) corresponding to a final recipient of the MPDU, a sequence number (SN) associated with the MPDU, or a packet number (PN) associated with the MPDU; and
- the MIC is further associated with at least one of: the MAC header or a per-hop integrity key.

4. The apparatus of claim 3, wherein the RA indicates the second wireless node and the DA indicates a client wireless node, and wherein the second wireless node is different from the client wireless node.

5. The apparatus of claim 3, wherein the RA indicates the second wireless node, and wherein the second wireless node corresponds to a client wireless node.

6. The apparatus of claim 2, wherein the one or more processors, individually or collectively, are further configured to execute the instructions and to cause the apparatus to:
- verify the MIC using information associated with the MAC header; and
- place, after verifying the MIC, the encrypted payload in a buffer associated with the apparatus.

7. The apparatus of claim 2, wherein, at least one of:
the MIC is further associated with at least one of: a new key or a new packet number (PN),
the new PN is associated with the MPDU,
the new key is different from a key configured for regular data encryption,
the new PN is different from a PN configured for the regular data encryption, or
the new PN associated with the MPDU is incremented each time at least one of: a new MAC header is created or a new MIC is created.

8. The apparatus of claim 7, wherein the one or more processors, individually or collectively, are further configured to execute the instructions to cause the apparatus to:
verify the MIC using information associated with the new PN, and
accept, after verifying the MIC, the encrypted payload.

9. The apparatus of claim 1, wherein the one or more processors, individually or collectively, are further configured to execute the instructions to cause the apparatus to: transmit, via the at least one transceiver, a block acknowledgement (BA) indicating one or more bits providing an acknowledgment feedback for the encrypted payload to the first wireless node, wherein the BA is associated with a BA agreement between the first wireless node and the second wireless node.

10. The apparatus of claim 9, wherein:
the acknowledgment feedback indicates a positive acknowledgment when the MPDU is successfully received at the apparatus.

11. The apparatus of claim 9, wherein the acknowledgment feedback indicates a negative acknowledgment when the MPDU is not successfully received at the apparatus, and wherein the acknowledgment feedback further indicates an identification (ID) of the MPDU.

12. The apparatus of claim 1, wherein the one or more processors, individually or collectively, are further configured to execute the instructions and to cause the apparatus to:
create a new MAC header for the MPDU, wherein the new MAC header is associated with at least one of:
a new transmitter address (TA) corresponding to an immediate sender of the MPDU,
a new receiver address (RA) corresponding to an immediate receiver of the MPDU,
a source address (SA) corresponding to an original source of the MPDU,
a destination address (DA) corresponding to a final recipient of the MPDU, or
a sequence number (SN) associated with the MPDU, or a packet number (PN) associated with the MPDU;
compute a new message integrity code (MIC) associated with the MPDU using information associated with the new MAC header; and
transmit, via the at least one transceiver, at least one of: the new MIC or the new MAC header to the second wireless node.

13. The apparatus of claim 1, wherein the apparatus is configured to operate as an access point (AP).

14. The apparatus of claim 13, wherein:
the AP is associated with a backhaul STA (bSTA), and
the bSTA associates the AP with the first wireless node.

15. The apparatus of claim 14, wherein:
the AP is associated with a backhaul basic service set (bBSS),
the bBSS associates the AP with the second wireless node, and
the bSTA forwards the encrypted payload to the bBSS.

16. The apparatus of claim 13, wherein the AP is associated with a proxy station (pSTA) and at least one of:
the pSTA is associated with a single mobility domain (SMD) access point (AP) multi-link device (MLD),
the pSTA manages a block acknowledgement (BA) session for transmitting one or more BAs,
the pSTA is associated with one or more pSTA instances, each of the one or more pSTA instances is associated with a wireless station (STA), or
the pSTA embeds an association identification (AID) within the MPDU transmitted from the pSTA.

17. The apparatus of claim 1, wherein at least one of:
the apparatus is positioned between the first wireless node and a client wireless node;
the second wireless node is positioned between the first wireless node and the client wireless node;
the one or more processors, individually or collectively, are further configured to execute the instructions to cause the apparatus to establish a first block acknowledgement (BA) session with the second wireless node for an end-to-end communication flow from the first wireless node to the client wireless node; or
the first BA session is different from a second BA session between the first wireless node and the client wireless node.

18. The apparatus of claim 1, wherein the one or more processors, individually or collectively, are further configured to execute the instructions to cause the apparatus to, at least one of:
randomly receive, via the at least one transceiver, one or more MPDUs, in accordance with a status of a link between the apparatus and the second wireless node; or
transmit, via the at least one transceiver, a negative acknowledgment indicating that the one or more MPDUs are not successfully received at the apparatus.

19. The apparatus of claim 18, wherein the one or more processors, individually or collectively, are further configured to execute the instructions to cause the apparatus to:
receive, via the at least one transceiver, a first set of MPDUs at one or more rates associated with a first average rate; and
receive, via the at least one transceiver, after receiving the first set, a second set of MPDUs at one or more rates associated with a second average rate, wherein at least one of:
the first average rate is different from the second average rate;
the first average rate and the second average rate are the same; or
the first set includes the MPDU.

20. The apparatus of claim 18, wherein the one or more processors, individually or collectively, are further configured to execute the instructions to cause the apparatus to:
receive, via the at least one transceiver, a first set of MPDUs at one or more rates associated with a first average rate; and
transmit, via the at least one transceiver, a second set of MPDUs at one or more rates associated with a second average rate, wherein at least one of:
the status of the link is associated with the second average rate;
the second average rate is lower than the first average rate; or
the first set includes the MPDU.

21. An apparatus for wireless communication, comprising:

at least one transceiver;
at least one memory comprising instructions; and
one or more processors, individually or collectively, configured to execute the instructions to cause the apparatus to:
encrypt a payload of a medium access control (MAC) protocol data unit (MPDU); and
transmit, via the at least one transceiver, to a second wireless node, the encrypted payload destined for a first wireless node, wherein the apparatus and the first wireless node have an end-to-end wireless association.

22. The apparatus of claim 21, wherein the payload of the MPDU is encrypted using a pairwise transient key (PTK) associated with the apparatus and the first wireless node.

23. The apparatus of claim 21, wherein the one or more processors, individually or collectively, are further configured to execute the instructions and to cause the apparatus to: create a MAC header associated with the MPDU, wherein the MAC header is further associated with at least one of:
a transmitter address (TA) corresponding to an immediate sender of the MPDU,
a receiver address (RA) corresponding to an immediate receiver of the MPDU,
a source address (SA) corresponding to an original source of the MPDU,
a destination address (DA) corresponding to a final recipient of the MPDU,
a sequence number (SN) associated with the MPDU, or
a packet number (PN) associated with the MPDU.

24. The apparatus of claim 23, wherein the one or more processors, individually or collectively, are further configured to execute the instructions to cause the apparatus to: compute a message integrity code (MIC) associated with the MPDU, wherein the MIC is further associated with at least one of: the MAC header or a per-hop integrity key.

25. The apparatus of claim 24, wherein the one or more processors, individually or collectively, are further configured to execute the instructions to cause the apparatus to transmit, via the at least one transceiver, at least one of: the MIC or the MAC header.

26. The apparatus of claim 21, wherein the apparatus is configured to operate as an access point (AP).

27. A method for wireless communication performable by a first wireless node, comprising:
receiving an encrypted payload of a medium access control (MAC) protocol data unit (MPDU) transmitted from a second wireless node and intended for a third wireless node, wherein a wireless association between the first wireless node and the third wireless node is with respect to the second wireless node; and
forwarding the received encrypted payload to the third wireless node.

* * * * *